US007016816B2

(12) United States Patent
Mott

(10) Patent No.: US 7,016,816 B2
(45) Date of Patent: Mar. 21, 2006

(54) METHOD FOR ESTIMATING AND REDUCING UNCERTAINTIES IN PROCESS MEASUREMENTS

(75) Inventor: Jack Edward Mott, Idaho Falls, ID (US)

(73) Assignee: Triant Technologies Inc., Nanaimo (CA)

( * ) Notice: Subject to any disclaimer, the term of this patent is extended or adjusted under 35 U.S.C. 154(b) by 148 days.

(21) Appl. No.: 10/398,425

(22) PCT Filed: Oct. 25, 2001

(86) PCT No.: PCT/CA01/01507

§ 371 (c)(1),
(2), (4) Date: Sep. 24, 2003

(87) PCT Pub. No.: WO02/35299

PCT Pub. Date: May 2, 2002

(65) Prior Publication Data
US 2004/0054507 A1 Mar. 18, 2004

Related U.S. Application Data

(63) Continuation-in-part of application No. 09/698,878, filed on Oct. 26, 2000, now abandoned.

(51) Int. Cl.
*G06F 17/16* (2006.01)

(52) U.S. Cl. .................. 702/196; 702/186; 702/188

(58) Field of Classification Search ................ 702/127, 702/179, 182, 183, 185, 186, 196; 701/205, 701/209; 703/2; 709/224
See application file for complete search history.

(56) References Cited

U.S. PATENT DOCUMENTS

| 4,937,763 | A | 6/1990 | Mott | 702/183 |
|---|---|---|---|---|
| 5,764,509 | A | 6/1998 | Gross et al. | 700/29 |
| 5,949,678 | A | 9/1999 | Wold et al. | 700/83 |
| 6,801,850 | B1 * | 10/2004 | Wolfson | 701/209 |
| 6,842,719 | B1 * | 1/2005 | Fitzpatrick et al. | 702/182 |

FOREIGN PATENT DOCUMENTS

WO    WO 00/60423  A1    10/2000

OTHER PUBLICATIONS

Waszak et al.; Uncertainty Modeling Via Frequency Domain Model Validation; 1999; American Institute of Areonautics and Astronautics; AIAA 99-3959; pp. 1-11.*

* cited by examiner

Primary Examiner—Marc S. Hoff
Assistant Examiner—Felix Suarez
(74) Attorney, Agent, or Firm—Townsend and Townsend and Crew LLP

(57) ABSTRACT

A reference matrix contains valid measurements characterizing operation of a multivariate process (220). Modeling parameters of the reference matrix are derived (222–232). The final model parameters, balanced with respect to measuring and modeling uncertainties (232), are applied to model (204) a new set of measurements (200). If the new set has no faults (206) then all modeled values and modeling uncertainties (208) can be used to control the process (218). If the new set has only one fault (210) ten the modeled value and modeling uncertainty of the faulted measurement plus the measured values and measuring uncertainties of the unfaulted measurements (212) can be used to control the process (218) while repair procedures are implemented for the identified fault (216). If the new set has more than one fault (214) then the process (218) should be shut down, and repair procedures should be implemented (216) for all identified faults.

30 Claims, 11 Drawing Sheets

METHOD FOR ESTIMATING AND REDUCING UNCERTAINTIES IN PROCESS MEASUREMENTS

REFERENCE TO RELATED APPLICATION

This is a continuation-in-part of U.S. patent application Ser. No. 09/698,878 filed Oct. 26, 2000 now abandoned.

TECHNICAL FIELD

This invention facilitates identification, modeling and reduction of uncertainties in measurements of system or process variables which characterize the system or process.

BACKGROUND

Systems or processes that are intended to produce a desired result, say a consistently manufactured industrial product, can be described by inter-related variables. Often, the variables are directly correlated with each other, but there are also situations where the variables are consistent with one another without being directly correlated. For example, a steady-state process where the variables that describe the process are supposed to have constant values contains no correlations between pairs of variables when the process is operating correctly. A variable that is determined only by the totality of a number of other variables will not be directly correlated with any single variable. But, a variable that is sensitive to process variations will change when the process changes no matter whether the correlation is bivariate or multivariate. The overall uncertainties with which measurements of variables characterize a system or process arise from the sizes of the correlations between the variables and the process, from the uncertainties introduced by measuring instruments, and from uncertainties in the system or process itself. This invention addresses such overall uncertainties. Hereafter, a multivariate system or process is simply called a "process", and the overall uncertainties are called "measuring uncertainties".

This invention seeks to: model measurements of process variables in such a manner that the measuring uncertainties are uncorrelated with the modeling uncertainties; produce models properly dependent upon the combined measuring uncertainties and modeling uncertainties; identify measurements for which uncertainties may be reduced; determine both measuring and modeling uncertainty limits; detect whether a given set of measurements contains one or more faults; and associate measuring uncertainty limits, modeled values, and modeling uncertainty limits with a set of measurements depending upon how many faults are contained therein. The modeling method used to achieve these goals is a vector modeling method which uses a reference set of measurements corresponding to numerous process variations.

Vector modeling techniques which are based on reference data can generally be applied to any process without process-specific application efforts. Neural networks, while based on reference data, are not generally applicable to a process without process-specific application efforts. Furthermore, neural networks produce modeling uncertainties which are directly correlated with measuring uncertainties. This invention does not require process-specific application efforts and produces modeling uncertainties which are uncorrelated with measuring uncertainties, so neural networks are not discussed further.

The most often used classical vector modeling technique employing a reference matrix of numerical vectors determines a model of one element, the output element, of a given reference vector as a linear combination of the remaining elements, the input elements, in the given reference vector. Effective use of this technique requires that the number of reference vectors be substantially larger than the number of elements in each reference vector. The linear combination coefficients are static because they are determined only from the reference matrix. Once determined, they may be used to model the output element of any new vector, containing the same number of numerical elements as the reference vectors, as a linear combination of the input elements in the new vector. This technique produces modeling uncertainties which are correlated with measuring uncertainties.

A less often used classical vector modeling technique employing a reference matrix of numerical vectors can be used to provide a model of any new vector containing the same number of numerical elements as the reference vectors. The model is a linear combination of the reference vectors and for this technique all elements of the vectors may simultaneously be considered as both input and output elements. Effective use of this technique requires that the number of reference vectors be substantially smaller than the number of elements in each reference vector. The linear combination coefficients are dynamic because they are determined not only from the reference matrix but also from the new vector.

In practice, for a specific process, the above techniques are usually applied after carefully specifying or determining exactly those process variables that should be measured to provide the vectors involved, and perhaps after specifying or determining the contribution of each vector element to the optimal conditions that determine the models. It is also quite common to transform the measurements prior to formation of the vectors involved. But, even after inclusion of such refinements in an application, the fact remains that both techniques ultimately reduce to those described above, and both determine their models from classical least-squares conditions. Specifically, the first classical modeling technique described above minimizes the squares of the differences between the reference and modeled output elements summed over reference vectors, whereas the second classical modeling technique minimizes the squares of the differences between the elements of the new vector and the elements of the modeled vector summed over elements.

It is a general characteristic of these classical techniques that their optimal solutions are very sensitive to even a single fault in one of the input elements. While these techniques can be used to detect that a fault has occurred in a system or process, they cannot automatically identify the input elements that are faulted nor can they offer replacement values for faulted elements, replacement values that might be extremely important for controlling a process after a fault has occurred.

The second classical method was altered by minimizing a new function of the new vector and the modeled vector, providing an improved method for analyzing the states of a system or process (see U.S. Pat. No. 4,937,763 Mott). Models yielded by the improved analysis method of the '763 patent are very tolerant of even multiple faults in the input elements. The modeled elements can be used to detect that a fault or faults have occurred in a system or process, to identify the faulted element or elements, and to offer approximate replacement values for faulted elements. But the analysis method of the '763 patent suffers from a major drawback in that the importance of a given element to the modeling process is quite dependent upon the ratio of its measuring uncertainty to its magnitude. One result of this dependence is that all elements that have large measuring uncertainties and magnitudes near zero require special transformations in order to be modeled accurately.

The second classical method was also altered by minimizing another new optimal function of the new vector and the modeled vector and is embodied in "ModelWare™", a commercially available product of Triant Technologies, Inc., Nanaimo, British Columbia, Canada offering off-line fault detection, fault isolation, and post-fault control for almost any system or process. The ModelWare™ product's modeling technique treats the combination of measuring and modeling uncertainties as dynamic and based on a theoretical formula. The ModelWare™ product's modeling technique can accurately model vector elements of any magnitude, a significant improvement over the technique of the '763 patent.

Another prior art product, "ModelWare/RT™", also commercially available from Triant Technologies, Inc., facilitates real-time on-line operation in conjunction with large manufacturing processes. The Model-Ware/RT™ product employs the same modeling technique as the afore-mentioned ModelWare™ product, but the treatment of the combination of measuring and modeling uncertainties is based on modeling a reference matrix.

The optimal function utilized by the ModelWare™ and ModelWare/RT™ products is also utilized in an industrial process surveillance method (see U.S. Pat. No. 5,764,509 Gross et al). The '509 patent minimizes this optimal function in combination with a technique for accommodating time differences which may be necessary to take into account in order to create measurements of variables that represent a given state of a system or process, a technique for choosing nearest-neighbors to create a small reference matrix from a large set of reference vectors, and a technique for very early detection of faults.

The modeling technique utilized by the ModelWare™ and ModelWare/RT™ products suffers from the drawback that the importance of a given element to the modeling process is dependent upon the ratio of combined measuring and modeling uncertainties to its range in the reference data matrix. As a result of this dependence, any elements that have small ranges can dominate the modeling process.

The second classical technique, and the improved technique used in the ModelWare™ and ModelWare/RT™ products as usually applied, also produce modeling uncertainties which are directly correlated with measuring uncertainties. However, both these techniques offer slightly modified applications that produce modeling uncertainties that are uncorrelated with measuring uncertainties, but only for one measurement in each application. The result is that there is no balance between the measuring and modeling uncertainties with the measuring uncertainty larger than the modeling uncertainty for some measurements, as is desired, but vice-versa for other measurements.

The classical and improved vector modeling methods described above are typically used for fault detection with the unproved methods additionally used for fault identification and approximate replacement of faulted measurements. While vector modeling methods have been used to filter noise from measurements, Such a purpose has previously been accomplished by determining the parameters of a model with a specific analytic form. This invention uses vector modeling techniques employing reference sets of actual process measurements to specifically determine and reduce measuring uncertainties.

SUMMARY OF INVENTION

The invention facilitates control of an m variable multivariate system or process. A historical reference data set containing numerical measurements of the m variables is initially developed, such that the measurements collectively encompass a plurality of variations within one or more operational states of the system or process. The historical reference data is then modeled to produce modeled values of the reference data set measurements which are balanced with respect to uncertainties inherent in the reference data set measurements and with respect to uncertainties characteristic of the modeling. A final model of the historical reference data is derived by sequentially repeating the modeling process until successively derived sums of all of the measurement and modeling uncertainties are approximately equal. A set of modeling parameters characteristic of the final model is derived. The modeling parameters are then applied to a new data set comprising numerical measurements of the m variables, such that the new data set measurements also collectively encompass the plurality of variations within the one or more operational states of the system or process. This produces modeled values of the new data set measurements corresponding to each one of the respective reference data set measurements. Continued operation of the multivariate system or process can then be controlled in various ways, such as by application of the measuring uncertainties.

For example, if the modeling uncertainties do not exceed the measurement uncertainties it can be concluded that there are no faults in the new data set measurements. In such case, all of the modeled values of the reference data set measurements and all of the modeled values of the new data set measurements; or, just the modeling uncertainties, can be applied to control the multivariate system or process.

If only one of the modeling uncertainties exceeds a corresponding one of the measurement uncertainties, it can be concluded that there is a fault in that one of the new data set measurements for which the one of the modeling uncertainties exceeds the corresponding one of the measurement uncertainties. In such case, any one of: the modeled value of the faulted one of the new data set measurements; or, the modeling uncertainty of the faulted one of the new data set measurements; or, the measured values of all of the new data set measurements excepting the faulted one of the new data set measurements; or, the measuring uncertainties of all of the new data set measurements excepting the faulted one of the new data set measurements; or, the identity of the faulted one of the new data set measurements, can be applied to control the multivariate system or process.

If more than one of the modeling uncertainties exceeds a corresponding one of the measurement uncertainties, it can be concluded that there is a fault in each one of the new data set measurements for which the one of the modeling uncertainties exceeds the corresponding one of the measurement uncertainties. In such case, the identities of the faulted ones of the new data set measurements can be used to repair the multivariate system or process.

DESCRIPTION

The invention provides six series of operations depicted in FIGS. 1–6C respectively. Three unique features of the invention are of special importance. First, the unique optimal functions used in determining the column vector C, as described below in reference to FIGS. 3A–3B. Secondly, the coefficients of the column vector C (also described below in reference to FIGS. 3A–3B) have three unique properties, namely for valid models each coefficient is always less than unity, the sum of the coefficients is always very near unity, and the sum of the squares of the coefficients is less than unity. Consequently, as hereinafter explained, the coefficients of the column vector C can be used for validation purposes, for identifying measurements for which uncertainties can be reduced, and for deriving both measuring and modeling uncertainty limits. Thirdly, the invention achieves properly balanced contributions of each variable to the modeling procedure.

The following mathematical conventions are hereafter adopted: matrices are denoted by boldface tipper case symbols (i.e. X); vectors are denoted by upper case symbols (i.e. X); scalars with subscripts are denoted by lower case symbols (i.e. $x_j$), and indices and scalars without subscripts are denoted by italicized symbols (i.e. n).

Figure 1:
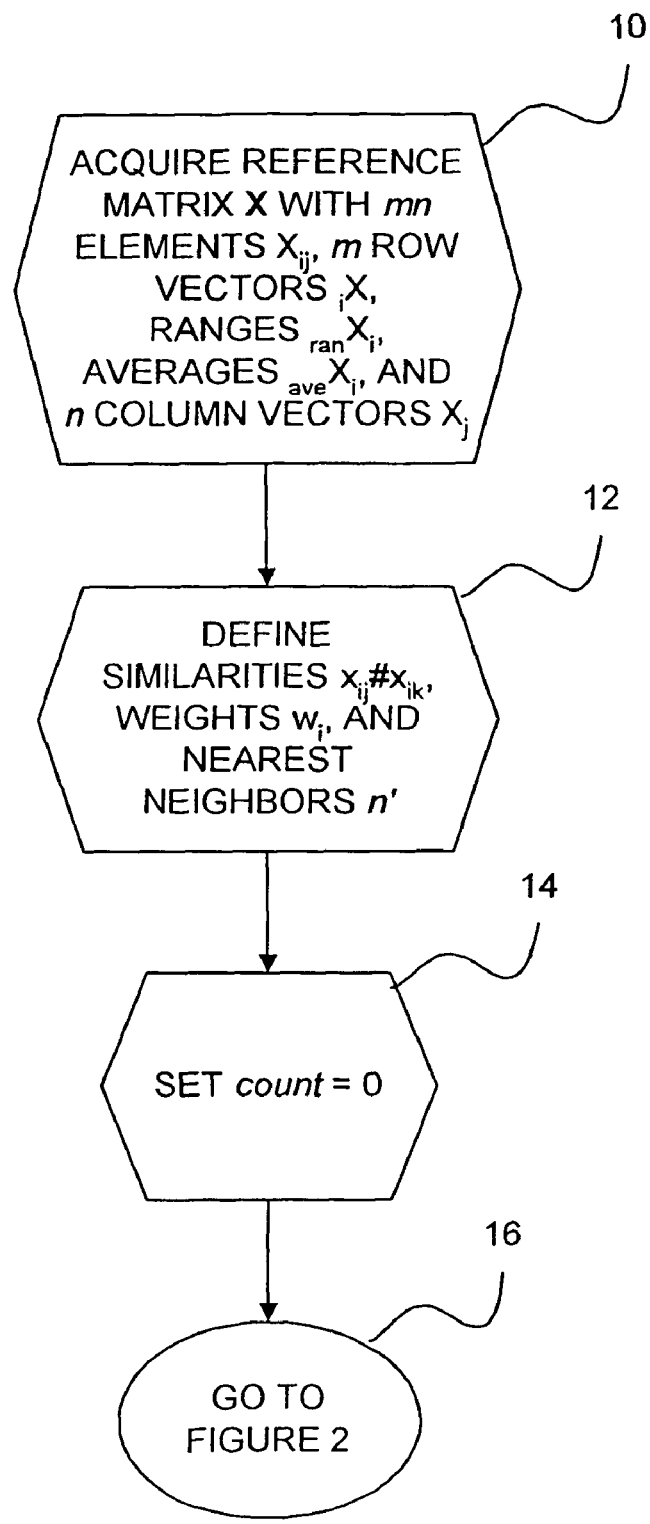
FIGS. 1 through 6C inclusive are flowcharts representative of the sequence of operations performed in accordance with the preferred embodiment of the invention.

First Series of Operations (FIG. 1)

In accordance with the invention, a process is modeled by first constructing an m row by n column reference matrix X (block 10). The n column vectors $X_j$ in X respectively comprise numerical measurements of m selected variables which describe a process and which collectively encompass a plurality of variations within one or more operational states of the process. The n column vectors $X_j$ in X have elements $x_{ij}$, where i=1 to m and j=1 to n. The m row vectors $_iX$ in X respectively comprise elements $x_{ij}$ having a range $_{ran}x_i$ and an average $_{ave}x_i$ Unique to the invention is the definition (block 12) of the "similarity" $x_{ij}\#x_{ik}$ between example j of measurement i and example k of measurement i where:

$$x_{ij}\#x_{ik} = \max(0, 1 - |x_{ij} - x_{ik}|/w_i)$$

and where $w_i$ is a weight initially defined as $$w_i = {}_{ran}x_i$$

A quantity n' for later use, the number of "nearest neighbors", should be chosen as an integer within the limits $$2 < n' < m$$

After a counter is initialized (block 14) the modeling operation continues as follows.

Figure 2:
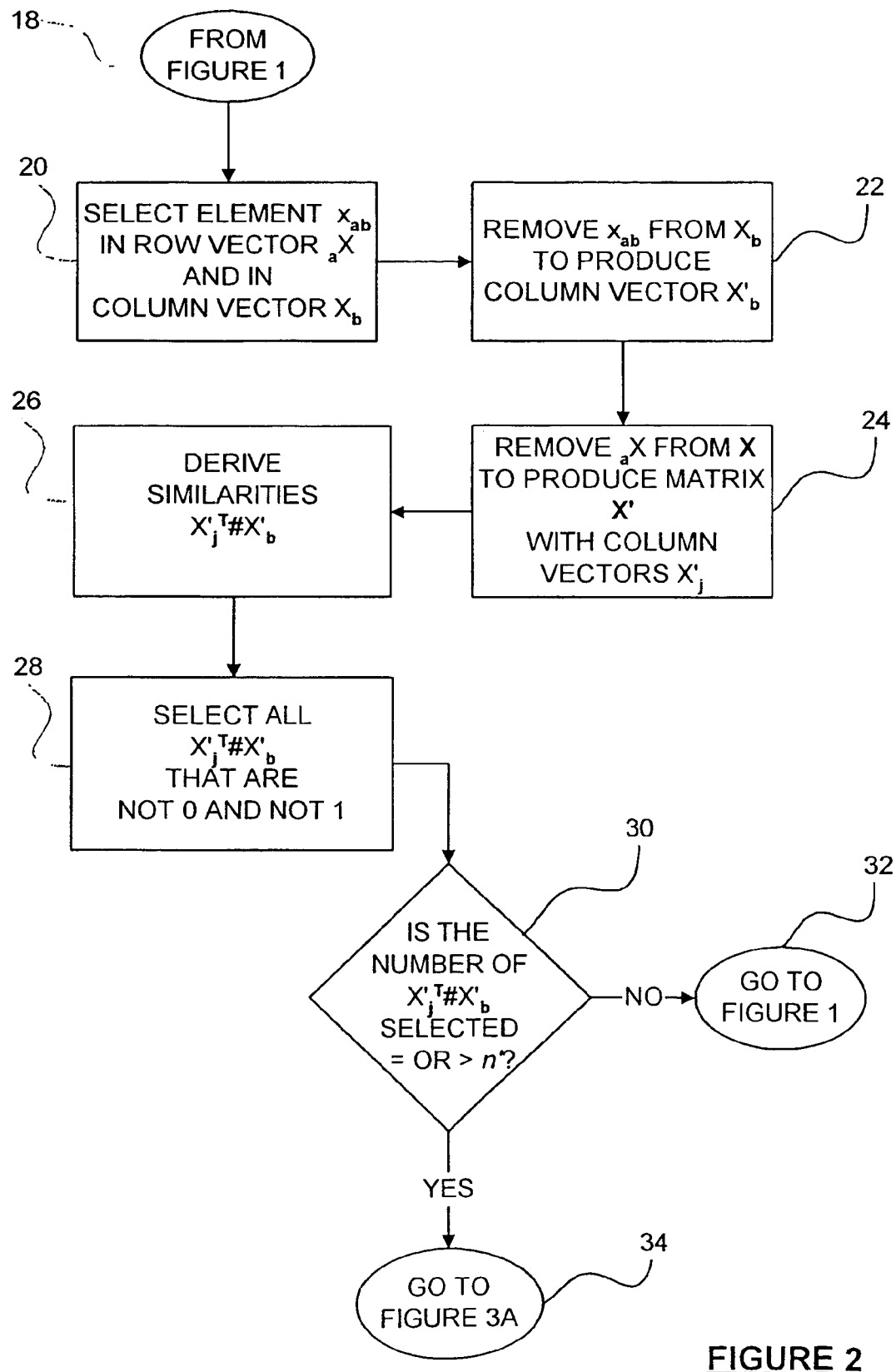

Second Series of Operations (FIG. 2)

An element $x_{ab}$ common to a row vector $_aX$ and column vector $X_b$ is selected (block 20) and removed (block 22) from $X_b$ to produce an m–1 element column vector $X'_b$. Row vector $_aX$ is removed (block 24) from X to produce an m–1 row by n column matrix X' comprising the column vectors $X'_j$. The similarity $X'^T_j \# X'_b$ between the two column vectors $X'_j$ and $X'_b$ is given by:

$$X'^T_j\#X'_b = (x_{1j}\#x_{1b} + x_{2j}\#x_{2b} + \ldots + x_{a-1\,j}\#x_{a-1\,b} + x_{a+1\,b}\#x_{a+1\,b} + \ldots + x_{mj}\#x_{mb})/(m-1)$$

and derived (block 26) for all j=1 to n. The largest n' of these similarities not equal to unity and not equal to zero are selected (block 28). If n' of these similarities cannot be formed, then that is an indication that X is an inadequate description of the process and that a new or revised X should be formed, or a new value of n' chosen, and the operations of the invention repeated (block 32), beginning with the above-described FIG. 1 series of operations. Otherwise, the modeling operation continues as follows.

Figure 3A:
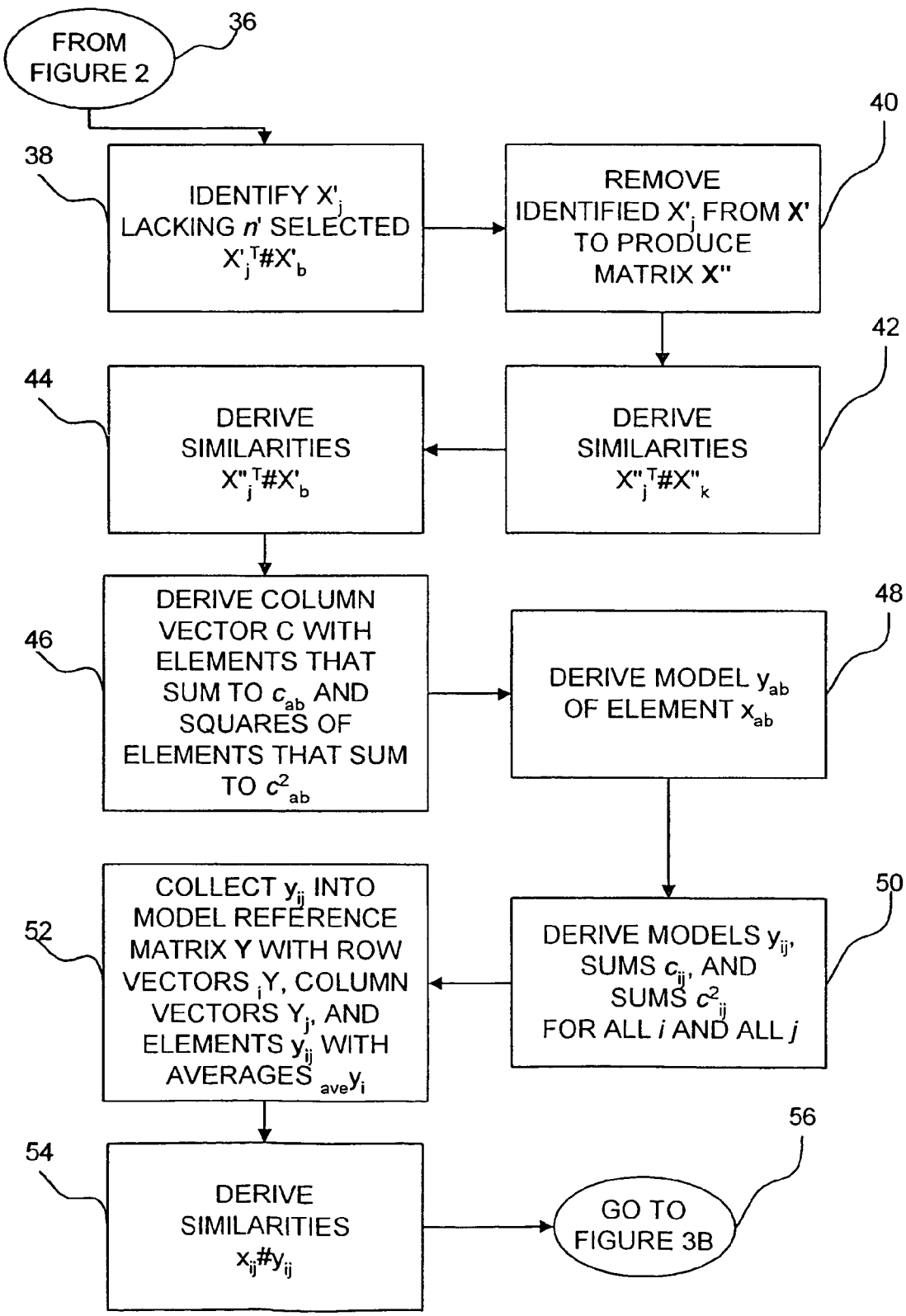
Figure 3B:
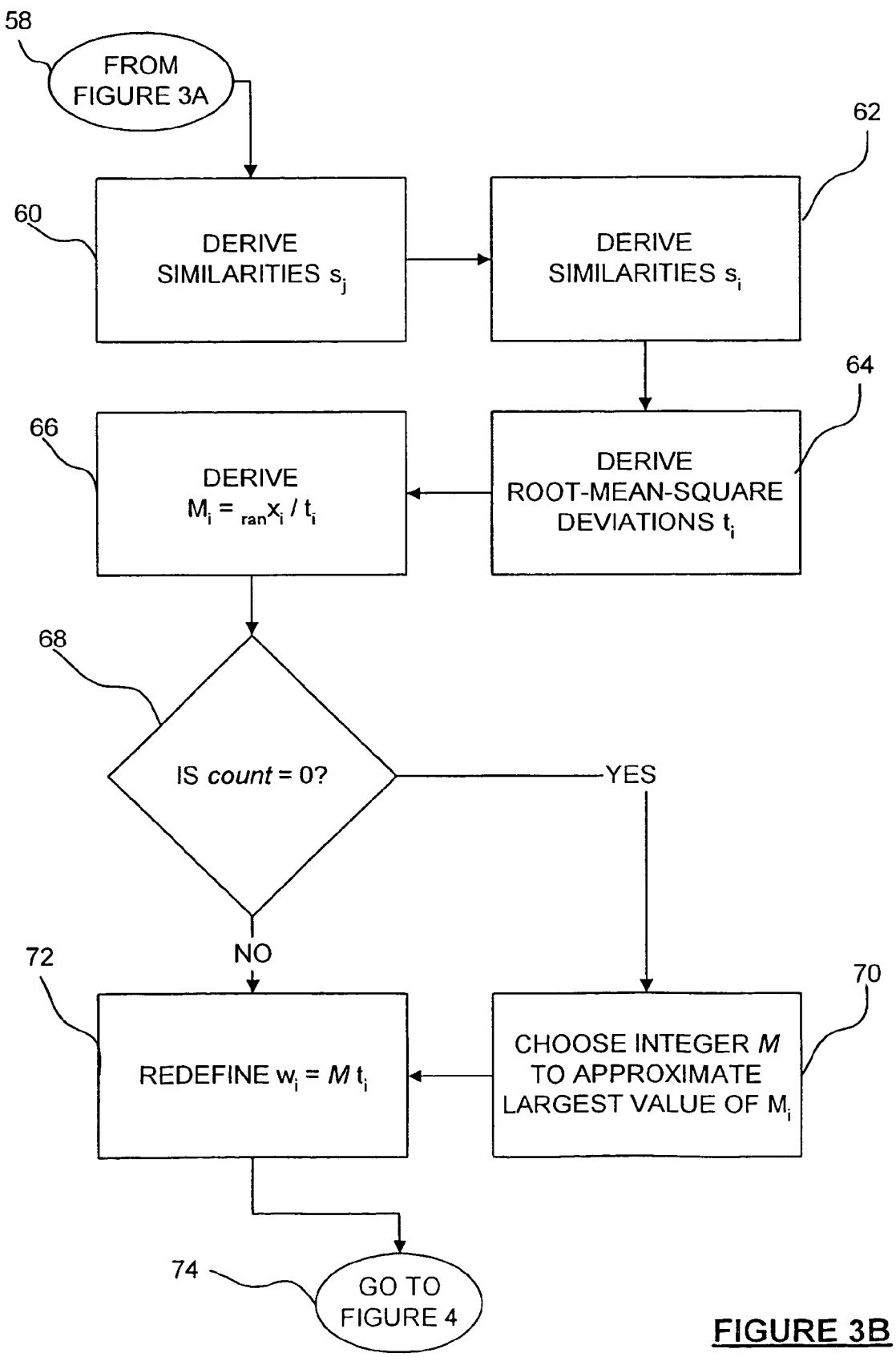

Third Series of Operations (FIGS. 3A–3B)

After performing the FIG. 2 series of operations, an m–1 row by n' column matrix X" is formed by removing (block 40) from X' all column vectors $X'_j$ in X' which lack (block 38 the n' selected similarities. The elements of the matrix X" are specified as $x_{ij}$ for i=1 to m and j=1 to n'. Similarities $X"^T_j \# X"_k$ between column vector $X"_j$ and column vector $X"_k$ in the matrix X", are given (block 42) by $$X"^T_j\#X"_k = (x_{1j}\#x_{1k} + x_{2j}\#x_{2k} + \ldots + x_{a-1\,j}\#x_{a-1\,k} + x_{a+1\,j}\#x_{a+1\,k} + \ldots + x_{mj}\#x_{mk})/(m-1)$$

for all j=1 to n' and all k=1 to n'. Similarities $X"^T_j\#X'_b$ between column vector $X"_j$ in the matrix X" and column vector $X'_b$, are given (block 44) by $$X"^T_j\#X'_b = (x_{1j}\#x_{1b} + x_{2j}\#x_{2b} + \ldots + x_{a-1\,j}\#x_{a-1\,b} + x_{a+1\,j}\#x_{a+1\,b} + \ldots + x_{mj}\#x_{mb})/(m-1)$$

for all j=1 to n'. An n' element column vector C is derived (block 46) as $$C = (X"^T\#X")^{-1}(X"^T\#X'_b)$$

where $X"^T\#X"$ represents the square matrix of $n'^2$ similarities $X"^T_j\#X"_k$ and $X"^T\#X'_b$ represents the column vector of n' similarities $X"^T_j\#X'_b$. The n' elements of column vector C sum to a value denoted by $c_{ab}$. The n' squares of elements of column vector C sum to a value by denoted by $c^2_{ab}$. Each element $x_{ab}$ is then modeled (block 48) as $$y_{ab} = {}_aXC + (1 - c_{ab})_{ave}x_a$$

for a=1 to m and b=1 to n to yield the model matrix Y. For the column vectors C the sums of the elements of are now denoted (block 50) by $c_{ij}$ and the sums of the squares of elements by $c^2_{ij}$. The n column vectors $Y_j$ in Y are now specified by the elements $y_{ij}$ and the m row vectors in Y are now specified (block 52) by $_iY$. The average of the $y_{ij}$ in $_iY$ are specified as $_{ave}y_i$. The similarities $x_{ij}\#y_{ij}$ are defined (block 54) as $$x_{ij}\#y_{ij} = \max(0, 1 - |x_{ij} - y_{ij}|/w_i)$$

and derived for all i=1 to m and all j=1 to n. The similarities $s_i$ between the $_iX$ and the $_iY$ are derived (block 62) for all i=1 to m as $$s_i = (x_{i1}\#y_{i1} + x_{i2}\#y_{i2} + \ldots + x_{in}\#y_{in})/n$$

The root-mean-square deviations $t_i$ between the $_iX$ and the $_iY$ are derived (block 64) for all i=1 to m as $$t_i = (((x_{i1} - y_{i1})^2 + (x_{i2} - y_{i2})^2 + \ldots + (x_{in} - y_{in})^2)/n)^{1/2}$$

The quantities $M_i$ are defined (block 66) for all i=1 to m as $$M_i = {}_{ran}x_i/t_i$$

An integer M is now chosen (block 70) that approximates the largest value of the $M_i$ and the weights $w_i$ are redefined (block 72) for all i=1 to m as $$w_i = Mt_i$$

The modeling operation then continues as follows.

Figure 4:
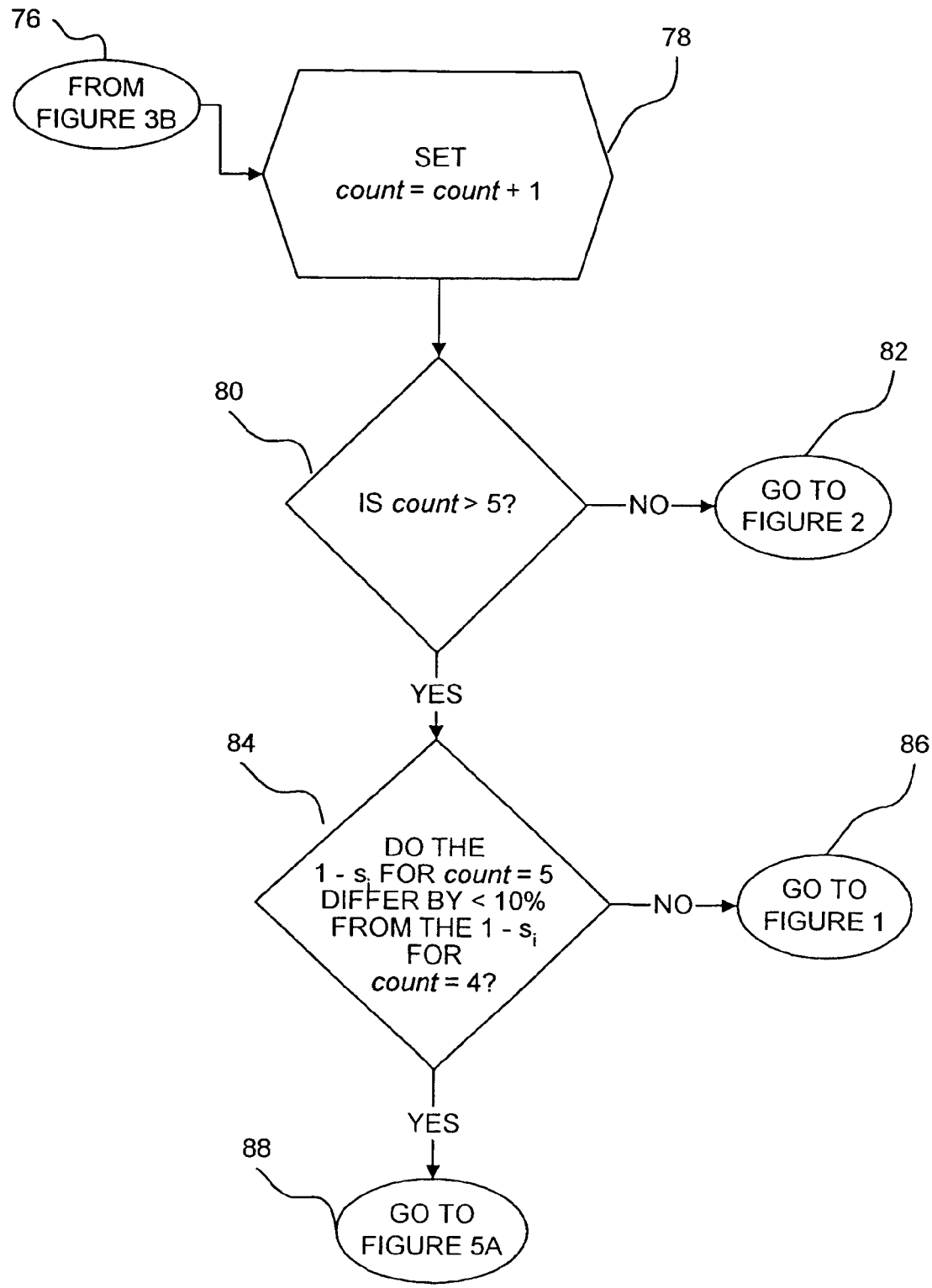

Fourth Series of Operations (FIG. 4)

As indicated in FIG. 4, the above-described FIG. 2 and FIGS. 3A–3B series of operations are sequentially repeated with the aid of the aforementioned counter (blocks 78, 80), to derive updated values of $w_i$ but without changing the value of M, to derive further model matrices until two or more successively derived model matrices have successive values of $1-s_i$ that differ by <10% (block 84). If values of $1-s_i$ differing by <10% cannot be achieved, then it may be concluded (block 86) that the reference matrix contains inaccurate measurements for at least one operational state of a process and that a new or revised reference matrix should be formed and the operations of the invention repeated, beginning with the above-described FIG. 1 series of operations. Otherwise, the modeling operation continues as follows.

Figure 5A:
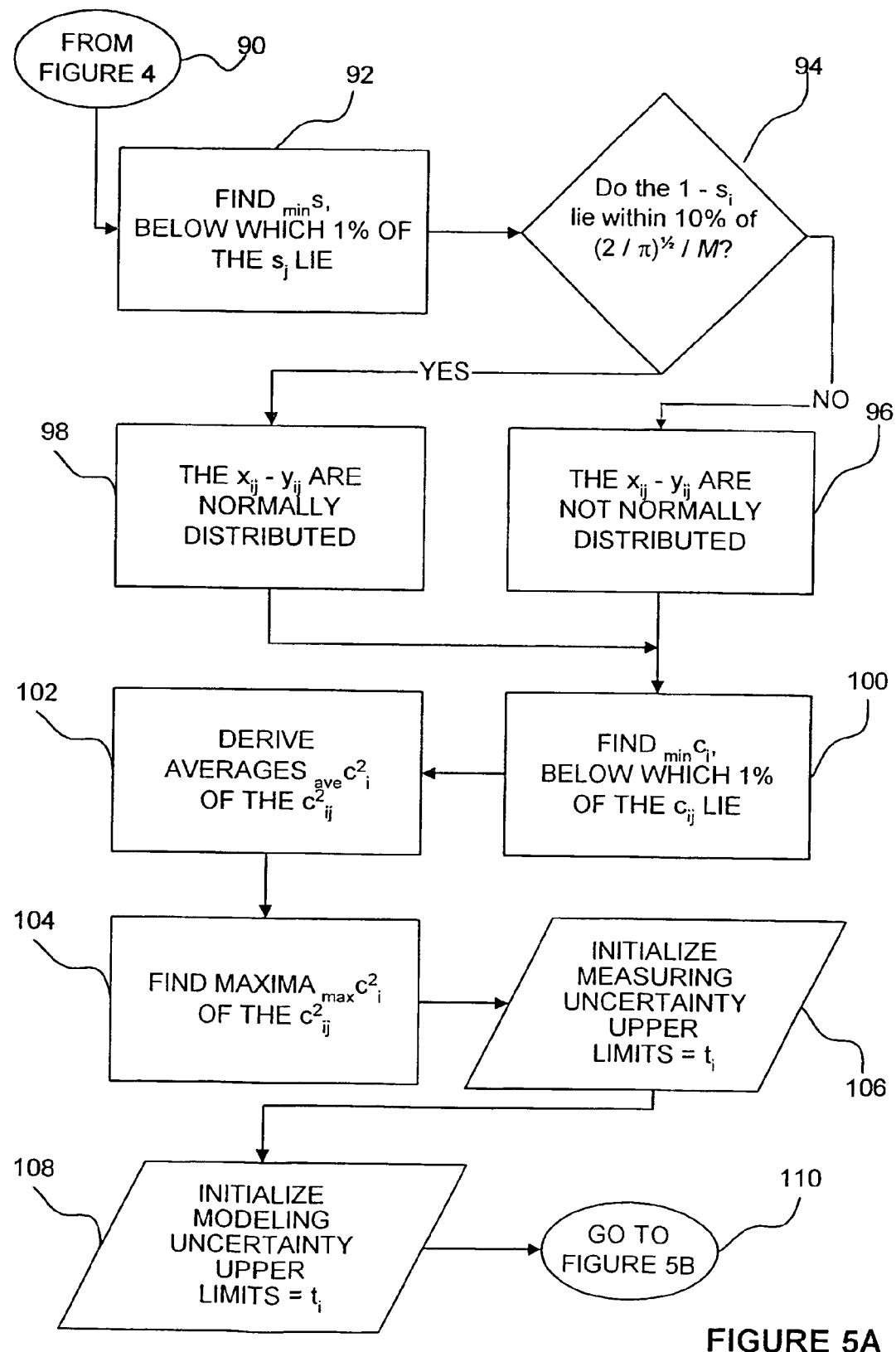
Figure 5B:
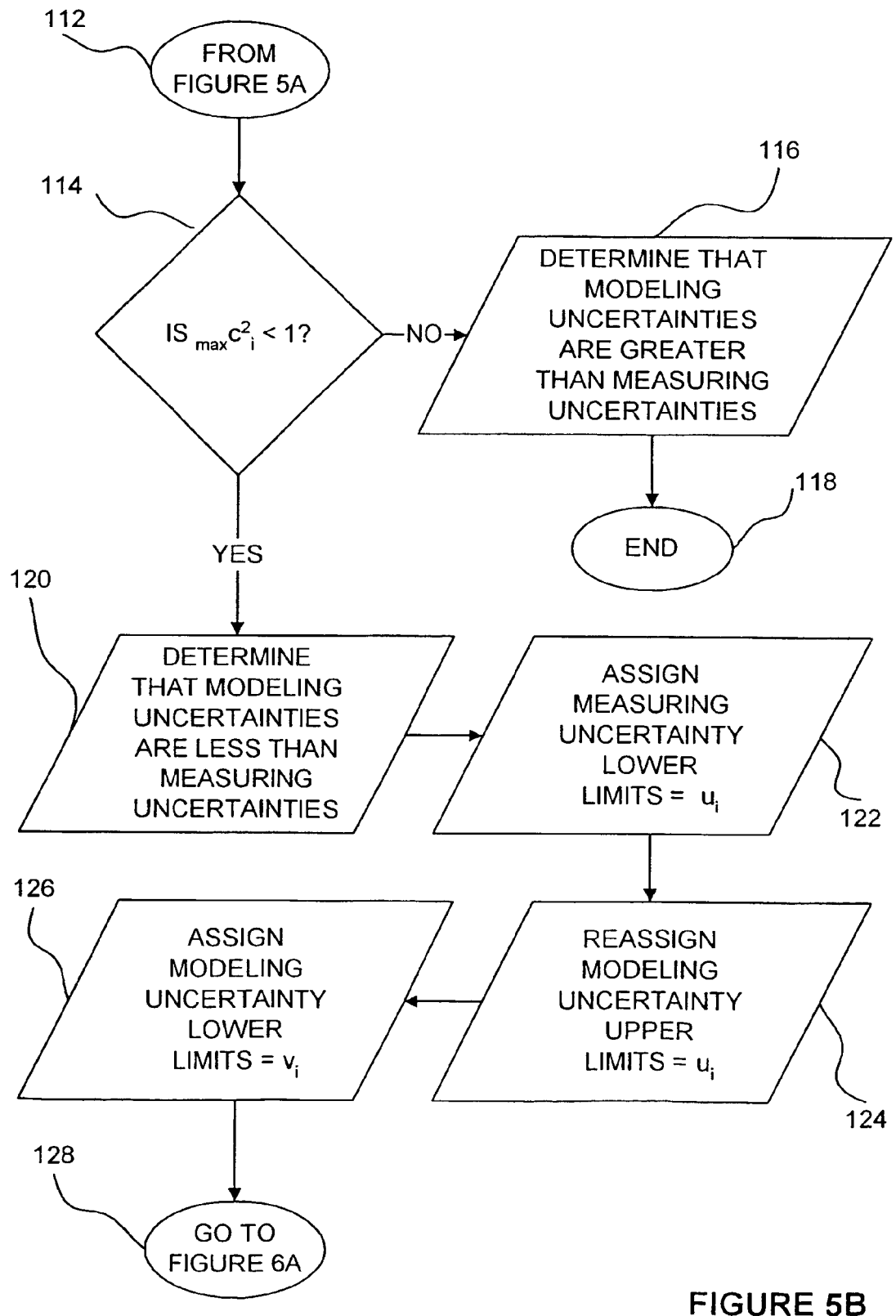

Fifth Series of Operations (FIGS. 5A–5B)

Sequential repetition of the FIG. 4 series of operations results in a final model matrix Y. As indicated in FIG. 5A, the final values of $s_i$ are reviewed (blocks 92, 94). If the differences between measured and final modeled values $x_{ij}-y_{ij}$ are normally distributed with a mean of zero then the $s_i$ have an expected value $_{exp}s$ which is given by $$_{exp}s = 1 - (2/\pi)^{1/2}/M$$

If all the values of $1-s_i$ lie within 10% of $1-_{exp}s$ then one may conclude (block 98) that the final differences $x_{ij}-y_{ij}$ are approximately normally distributed with a mean of zero; otherwise, one may conclude (block 96) that the final differences $x_{ij}-y_{ij}$ are not normally distributed. The limit $_{min}c_i$, below which 1% of the final values of the $c_{ij}$ lie over all j=1 to n, is found and recorded (block 100). The averages of the final values of the $c^2_{ij}$ over all j=1 to n are derived (block 102) and denoted by $_{ave}c^2_i$. The maxima of the final values of the $c^2_{ij}$ over all j=1 to n are derived (block 104) and denoted by $_{max}c^2_i$. Each measurement for which $_{max}c^2_i$ is less than unity is identified (block 114) as a measurement for which uncertainties can be reduced (block 120). The uncertainty limits $u_i$ and $v_i$ for all i=1 to m for which the $_{max}c^2_i$ are less than unity are estimated according to $$u_i = t_i(1/2)^{1/2}$$

$$v_i = t_i(_{ave}c^2_i/2)^{1/2}$$

The root-mean-square deviations $t_i$ are upper limits on both measuring and modeling uncertainties. For the $_{max}c^2_i$ that are less than unity the uncertainty limits $u_i$ are simultaneously new lower limits (block 122) on measuring uncertainties and upper limits (block 124) on modeling uncertainties, and the uncertainty limits $v_i$ are lower limits (block 126) on modeling uncertainties.

Figure 6A:
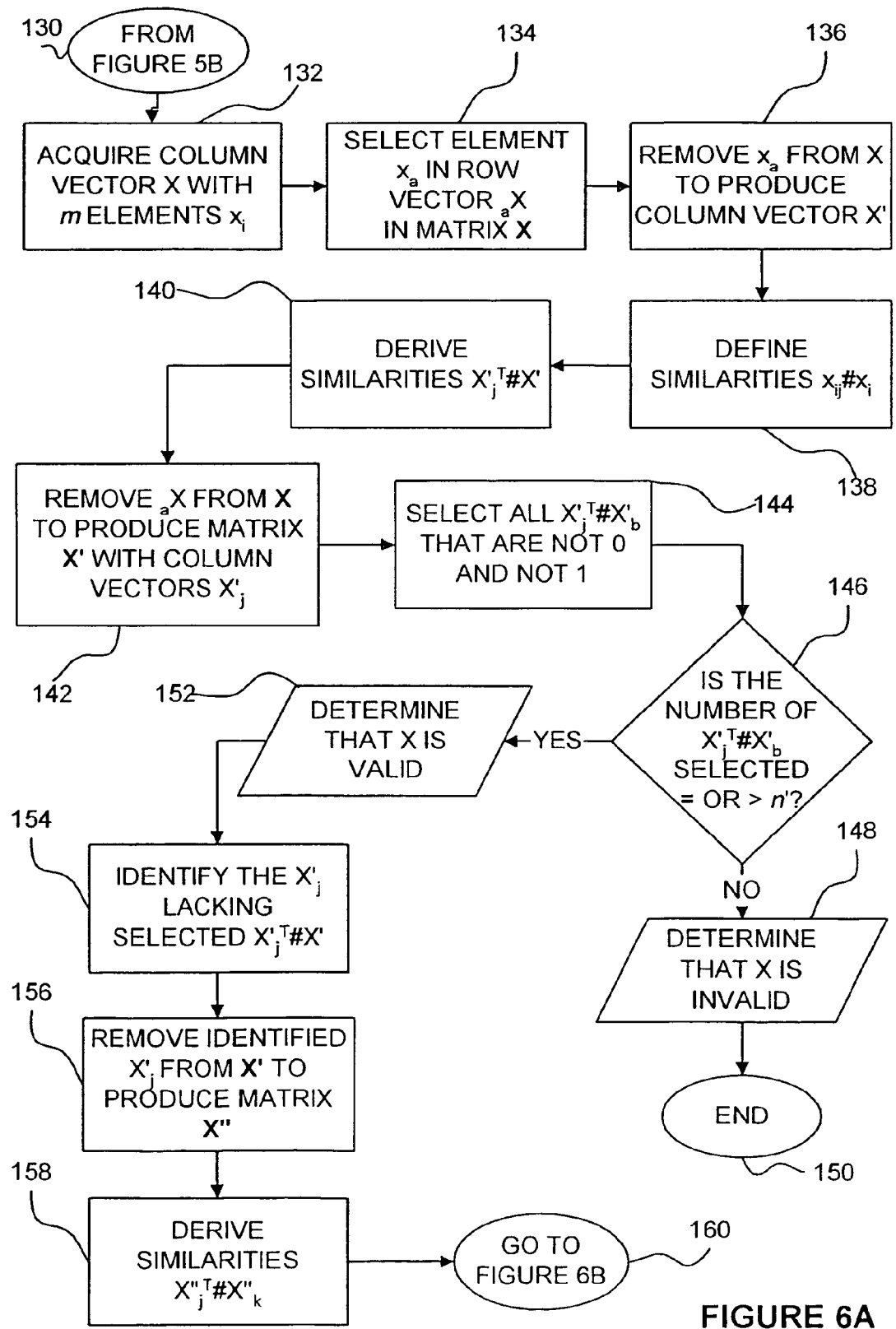
Figure 6B:
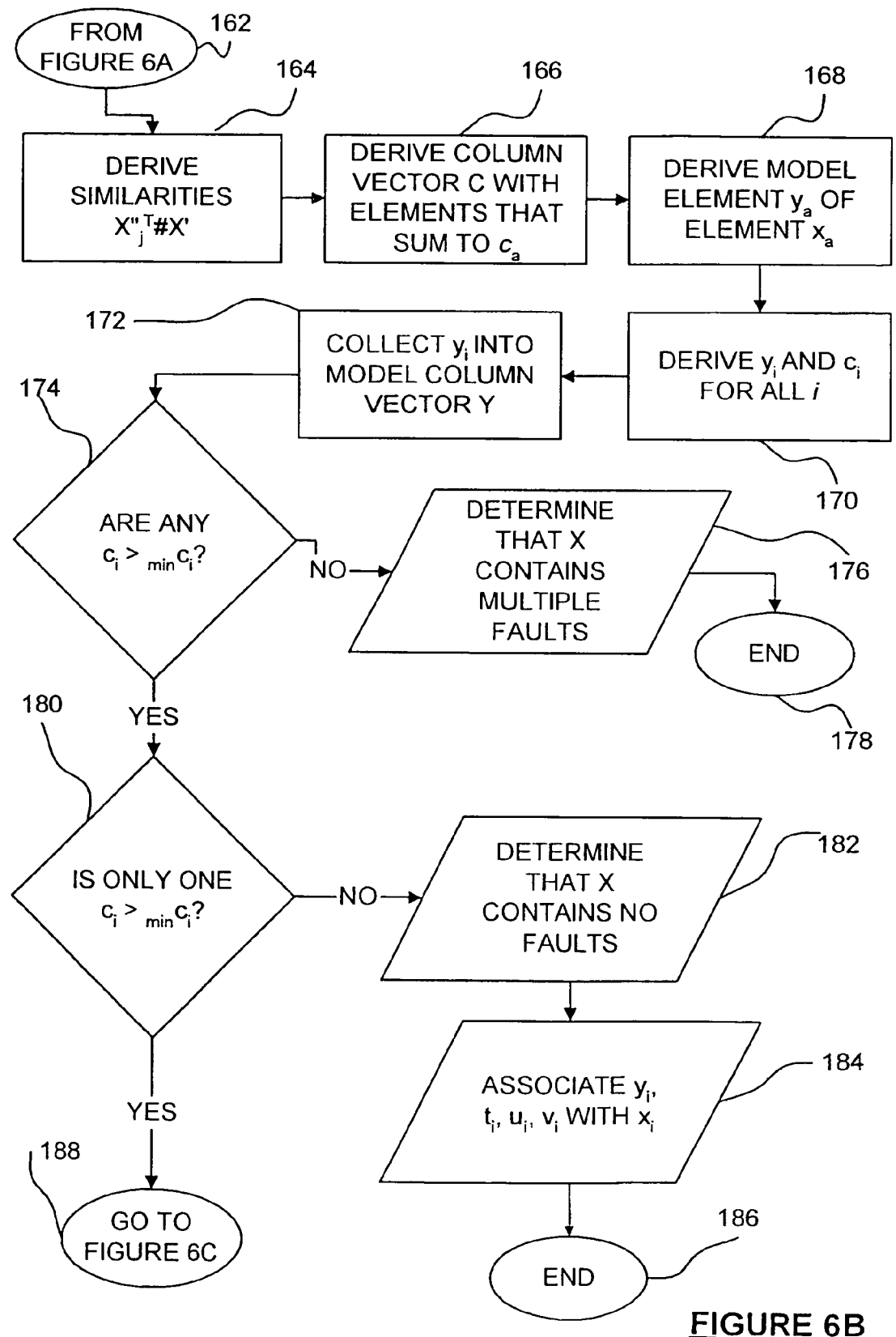
Figure 6C:
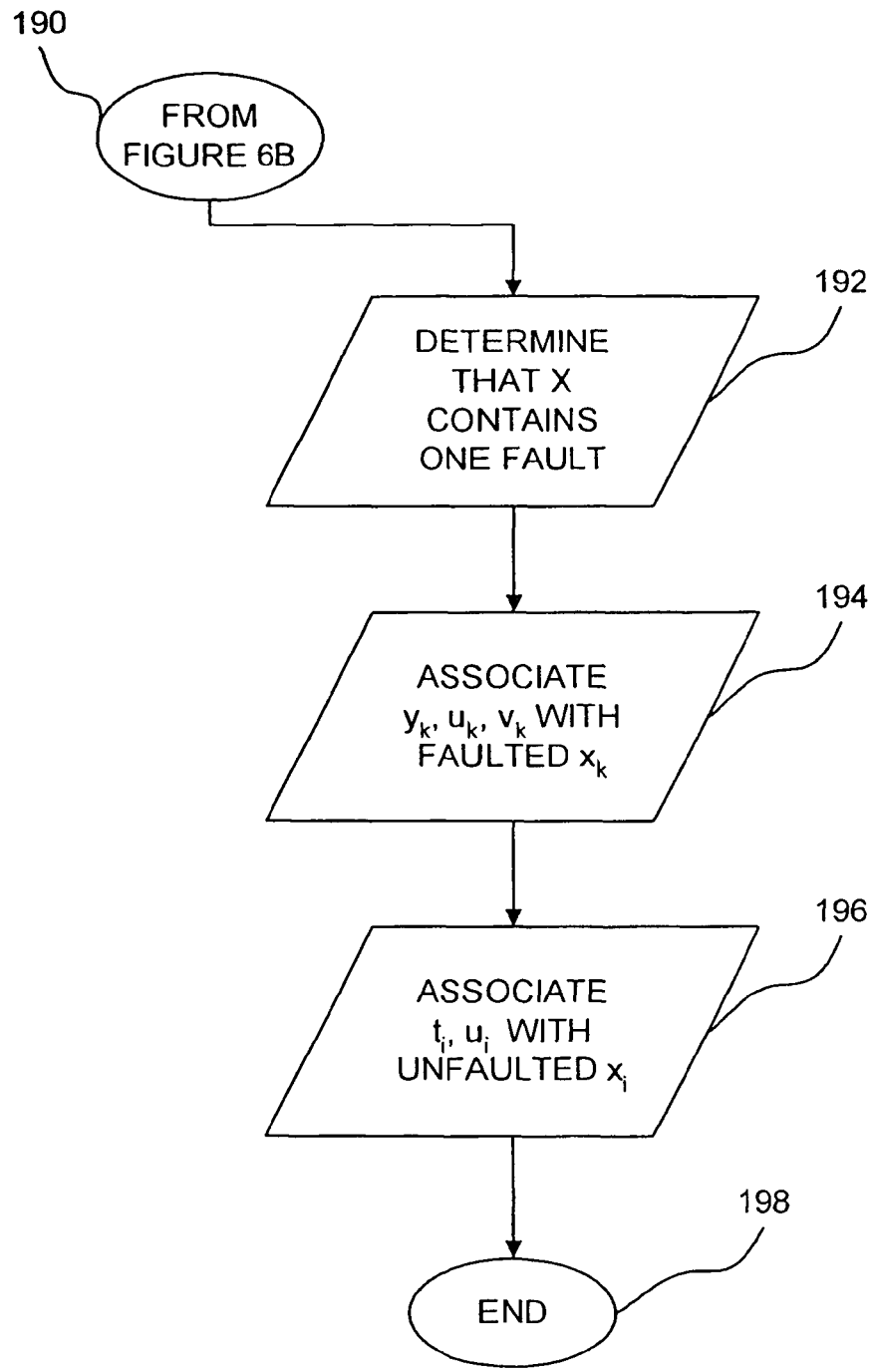

Sixth Series of Operations (FIGS. 6A–6C)

Given an arbitrary column vector X having m numerical elements $x_i$ (block 132) one may now derive a model column vector Y having m numerical elements $y_i$, as indicated in FIGS. 6A–6C. An element $x_a$ is selected (block 134) and removed (block 136) from X to produce an m−1 element column vector X'. Row vector $_aX$ is removed (block 142) from the matrix X to produce an m−1 row by n column matrix X' comprising the column vectors X'$_j$. The similarities $x_{ij}\#x_i$ between the $x_{ij}$ and the $x_i$ are defined (block 138) as $$x_{ij}\#x_i = \max(0, 1-|x_{ij}-x_i|/w_i);$$

The similarity X'$_j^T$#X' between the two column vectors X'$_j$ and X' is given (block 140) by $$X'^T_j\#X' = (x_{1j}\#x_1 + x_{2j}\#x_2 + \ldots + x_{a-1j}\#x_{a-1} + x_{a+1j}\#x_{a+1} + \ldots + x_{mj}\#x_m)/(m-1)$$

The largest n' of these similarities not equal to unity and not equal to zero are selected (block 144). If n' of these similarities cannot be formed (block 146) then that is an indication (block 148) that X is an invalid description of the process characterized by the matrix X. If n' of these similarities can be formed (block 152), then an m−1 row by n' column matrix X" is formed by removing (block 156) from X' all column vectors in X' which lack (block 154) the n' selected similarities. The elements of the matrix X" are specified as $x_{ij}$ for i=1 to m and j=1 to n'. Similarities X"$_j^T$#X"$_k$ between column vector X"$_j$ and column vector X"$_k$ in the matrix X", are given (block 158) by $$X''^T_j\#X''_k = (x_{1j}\#x_{1k} + x_{2j}\#x_{2k} + \ldots + x_{a-1j}\#x_{a-1k} + x_{a+1j}\#x_{a+1k} + \ldots + x_{mj}\#x_{mk})/(m-1);$$

for all j=1 to n' and all k=1 to n'. Similarities X"$_j^T$#X' between column vector X"$_j$ in the matrix X" and column vector X', are given (block 164) by $$X''^T_j\#X' = (x_{1j}\#x_1 + x_{2j}\#x_2 + \ldots + x_{a-1j}\#x_{a-1} + x_{a+1j}\#x_{a+1} + \ldots + x_{mj}\#x_m)/(m-1);$$

for all j=1 to n'. An n' element column vector C is derived (block 166) as $$C = (X''^T\#X'')^{-1}(X''^T\#X')$$

where X"$^T$#X" represents the square matrix of n'$^2$ similarities X"$_j^T$#X"$_k$ and X"$^T$#X' represents the column vector of n' similarities X"$_j^T$#X'. The n' elements of column vector C sum to a value $c_a$. Each element $x_a$ is then modeled (block 168) as $$y_a = _aXC + (1-c_a)_{ave}x_a$$

for a=1 to m to yield a column vector Y (block 172). The sums of the elements of the column vectors C are now specified as $c_i$, and the column vector Y is now specified by the elements $y_i$(block 170). If $c_i>_{min}c_i$ for more than one of the $x_i$ then it may be concluded (block 182) that none of the $x_i$ are faulted and that all the $y_i$, $t_i$, $u_i$, and $v_i$ may be associated with all the $x_i$ (block 184). If $c_k>_{min}c_k$ only for $x_k$ then it may be concluded (blocks 188, 190, 192) that only $x_k$ is faulted, that only $y_k$, $u_k$, and $v_i$ may be associated with $x_i$ (block 194), and that only the $t_i$ and $u_i$ may be associated with the unfaulted $x_i$ (block 196). And if $c_i>_{min}c_i$ for none of the $x_i$ then it may be concluded (block 176) that more than one of the $x_i$ are faulted and that none of the $y_i$, $t_i$, $u_i$, nor $v_i$ may be associated with the $x_i$.

ILLUSTRATIONS AND EXAMPLES

The major purpose of the invention is to provide a means of estimating and reducing uncertainties in the values of variables that specify the condition or state of a multivariate system or process, thereby improving the applications of such a system or process. For example, suppose a very simple system is specified by values of pressure, temperature and flow and one of its states is supposed to have the values 1000 Pa, 1000 K and 1000 kg/s. The process is supposed to be operating in that state and the measured values of pressure, temperature and flow are 1005 Pa, 990 K and 980 kg/s. Is something wrong with the system? That depends upon the measuring uncertainties. If the measuring uncertainties are 10 Pa, 20 K and 30 kg/s then the answer is "no". But if the measuring uncertainties are 1 Pa, 2 K and 3 kg/s then tile answer is "yes".

Determining measuring uncertainties is usually a lengthy and expensive process because experiments must be done with some way of knowing precisely what value each variable actually has and comparing those values with the measured values. As a result, for many systems or processes, measuring uncertainties are only vaguely known from observing the operation of the system. This invention provides a method of determining with a high degree of precision the actual measuring uncertainties by observing operation of the system without special experiments, and further offers a method of reducing those uncertainties when favorable characteristics of a system or process, characteristics that can be detected by the invention, are present. The invention is not restricted to any particular application of any particular system or process, but is universally applicable to any multivariate system or process. The advantages of the invention are obtained by taking advantage, in a particular application, of the accurate knowledge which the invention provides of possibly reduced uncertainties and resultant fault detection capabilities.

Figure 7:
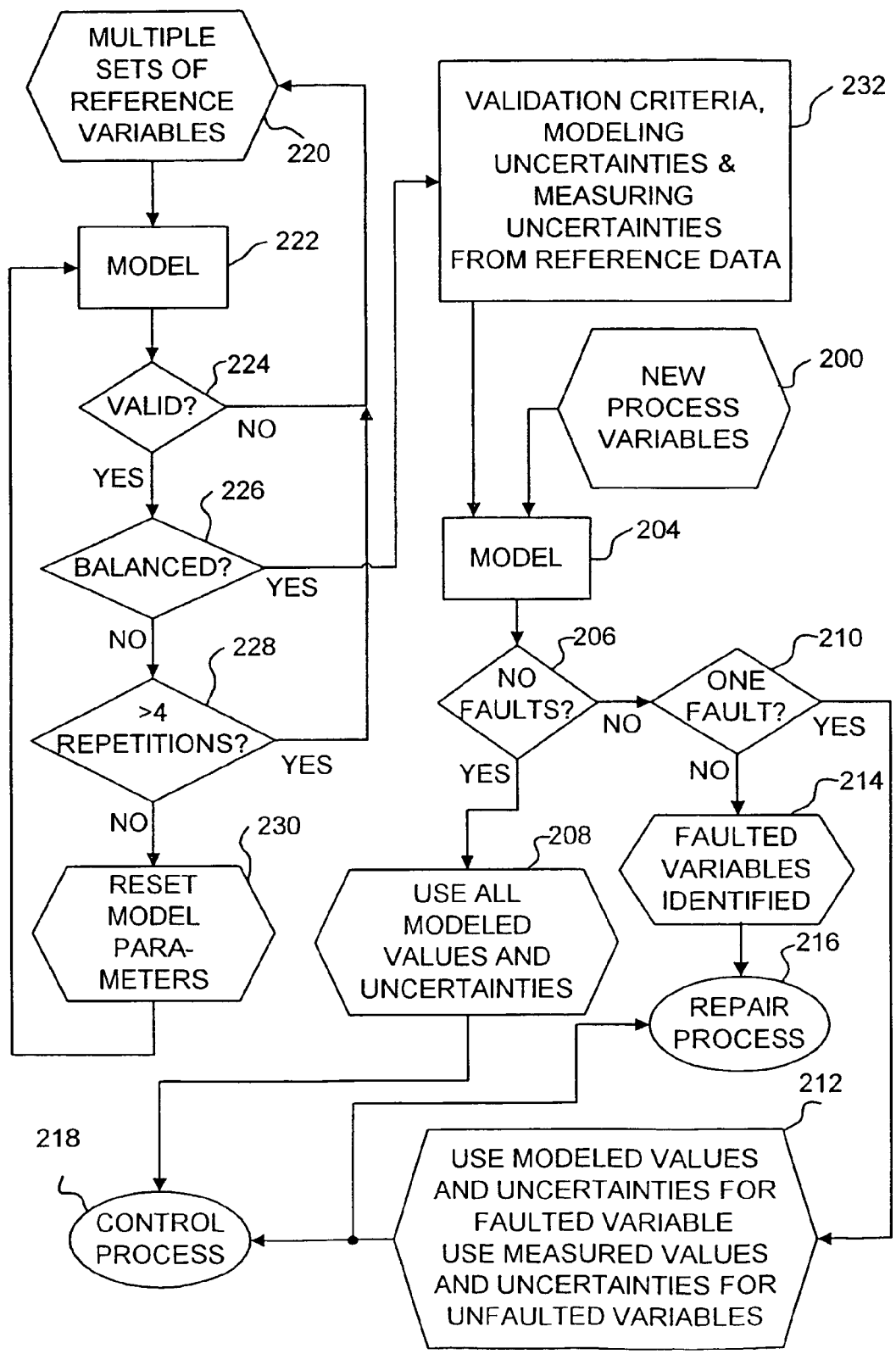
FIG. 7 is a flowchart illustrating generalized application of the invention to any multivariate system or process.

The invention may be generally applied to any multivariate system or process as shown in FIG. 7. The results (block 232) are assumed to be present from the modeling of adequate reference data that properly and accurately characterizes the desired range of operation of the system or process of interest. The modeling uncertainties are assumed to be smaller than the measuring uncertainties, as is the usual case with adequate reference data. These results are combined with a new set of process variable values (block 200) and modeled (block 204). The modeling method of the invention is then applied as described above to detect whether no faults exist (block 206) in the new set of process variable values or whether only one fault exists (block 210). If no faults exist then all modeled values and all modeling uncertainties may be immediately used (block 208) to control a process (block 218). If only one fault exists then the modeled value and modeling uncertainty of the faulted variable and the measured values and measuring uncertainties of all unfaulted variables (block 212) may be used to control the process. The identities of all faulted variables (blocks 212, 214) may be used to improve the repair process (block 216) by eliminating needless tests to identify the fault.

FIG. 7 is also useful in contrasting operation of a multivariate system or process in accordance with the prior art, to operation in accordance with the invention. Such prior art operation typically begins with the observation of process variables (block 200) which are used to control a process (block 218) automatically and/or manually. Conventionally, process variable thresholds or human memory of the way a process responds to control inputs are used to determine that the system is in need of repair (block 216). By contrast, by analyzing the reference data to determine its measuring uncertainties and combining such uncertainty information with newly observed process variables, the invention facilitates more accurate process control than is possible via the prior art technique of comparing measured values with thresholds. The most advantageous application of the invention combines the newly measured process variables (block 200), the highly precise modeling uncertainties, measuring uncertainties and the validation criteria (block 232) to determine the number of faults (blocks 206, 210, 214) to identify faulted variables (blocks 212, 214) in order to control the process (block 218) and direct repair efforts (block 216). If only one fault is present (block 210), the modeled and measured values and uncertainties can be used (block 212) to control the process (block 218) while identifying (block 214) the faulted variable(s) and directing repair efforts (block 216).

Thus the invention is generally applicable to any multivariate system or process to improve both control and repair of all processes affected by the particular process to which the invention is applied. Several illustrations are now provided to further clarify the invention.

Aircraft Takeoff Illustration

Consider the application of the invention to the detection of problems with the takeoff of a modern commercial jet aircraft.

Before takeoff, the weight and weight distribution of an aircraft is determined by the type of aircraft, the number of passengers and crew, and the amounts of baggage and fuel. Weather conditions such as temperature, wind velocity, humidity, rain, snow, and air pressure are measured. The direction and available length of runway are recorded. An aircraft in fully loaded takeoff condition has braking power that has a variable minimum stopping distance that grows as velocity increases during takeoff. The length of runway and the variable minimum braking distance combine to determine the maximum speed $v_1$, typically below 100 knots, beyond which the aircraft will not be able to stop on the runway even if the brakes and thrust reversers are fully applied in an aborted takeoff. Unfortunately, the speed $v_1$ is not enough to lift the fully loaded aircraft into the air. This requires a speed $v_2$ greater than $v_1$. The speed $v_2$ is typically well in excess of 100 knots. The takeoff of a modern jet aircraft thus consists of takeoff power application from rest until a speed in excess of $v_1$ is reached and the pilot is committed to takeoff, continued takeoff power application until a speed in excess of $v_2$ is reached, an aircraft rotation where the tail is lowered to greatly increase the angle of attack and the corresponding lift forces, and climbout while the aircraft gains altitude and airspeed. The speed $v_1$ may be reached typically in about 20 seconds and $v_2$ in about 30 seconds.

After the speed $v_1$ is reached the aircraft is substantially committed to takeoff. And of course the speed $v_2$ must be reached before the end of the runway. If the engine thrust has been compromised by the ingestion of foreign material or fuel delivery problems then the acceleration of the aircraft may not suffice to achieve $v_2$ before the runway ends. Furthermore, the expected lift of the aircraft as a function of velocity requires that the trailing-edge wing flaps are extended and that there is no ice buildup on the leading edge of the wing. If all these conditions are met then the aircraft is expected to takeoff before encountering a safety margin located well before the end of the runway is reached. If conditions are compromised to the extent that the aircraft takes off too close to the end of the runway then the pilot may elect to perform an air turnback where fuel must be dumped in order to lighten the aircraft for immediate landing because an aircraft in fully loaded takeoff condition is too heavy to land safely. The above conditions can also be marginally met to the extent that the aircraft is able to takeoff just before the end of the runway, even though $v_2$ has not been exceeded, because of extra lift provided by ground effects where an aircraft just off the runway has more lift than an aircraft that is substantially above the runway. In such a case an accident is almost inevitable when lift due to ground effects disappears.

The annals of air safety provide numerous instances of safely aborted takeoffs, numerous instances of safely executed air turnbacks, numerous incidents where aircraft have run off the end of the runway and sustained damage, and numerous accidents involving loss of aircraft and/or loss of life that are due to the absence of the necessary conditions for a safe takeoff as outlined above.

Imagine now that, as a given aircraft enters service, examples of data representing safe takeoffs are collected. The data are collected for different airports, runways, numbers of passengers, amounts of luggage, fuel loads, and weather conditions. As mentioned above, the data would include the direction and length of the runway, the weight of the aircraft, the number of passengers and crew, the weight of baggage, the weight of fuel, and weather conditions such as temperature, wind velocity, humidity, inches of rain, inches of snow, air pressure, and visibility. These data are constant during the entire takeoff. But in addition to these constant data would be added dynamic data such as altitude, distance, velocity, acceleration, time after application of takeoff power; readings from a number of pressure sensors located on the bottom and top surfaces of both wings, fuselage and rear elevators; the pilot's primary inputs to the control of the aircraft via throttle, stick, and rudder; response to the pilot's primary inputs such as the positions of all control surfaces and the pitch, roll, and yaw of the aircraft; hydraulic pressures in all essential control surface actuators; and engine control data such as fuel flow, rotational speeds of the turbine blades in the different compression stages, and exhaust gas temperatures.

The list of numbers representing the state of the aircraft would include all the constant data and all the dynamic data with both sets combined into one list of numbers recorded on a computer onboard the aircraft at, say, one-second intervals for one minute after the application of takeoff power. Thus the totality of data would consist of 60 such lists after the first takeoff, 120 such lists after the second takeoff, 180 such lists after the third takeoff, and so on. As more takeoffs occur these lists would begin to include a wide variety of weather conditions, passenger loads, and fuel loads. When the totality of lists encompasses the desired flight operations of the aircraft they may be used as reference data and analyzed in accordance with the invention.

Software embodying the invention could be stored on the computer onboard the aircraft. The reference data analyzed in accordance with the invention may constitute the validation criteria and limits on modeling and measuring uncertainties (FIG. 7, block 232). Thereafter, any new takeoff yields a new list of variable values (block 200) every second for one minute after the initiation of takeoff power. After that, every second for one minute, the invention can be applied to detect the number of faults (blocks 204, 206, 210, 214), identify any faults (blocks 210, 214) to the pilot who controls (block 218) the aircraft, and record the identities of all detected faults for future repair (block 216). If no faults are detected (blocks 206, 208) then all modeled values and all modeling uncertainties (block 208) can be displayed to the pilot who may elect to use them to partially control (block 218) the aircraft. If only one fault is detected (blocks 210, 212) then the modeled value and modeling uncertainty for the faulted variable, and the measured values and measuring uncertainties for the unfaulted variables (block 212) can be displayed to the pilot who may elect to use them to partially control (block 218) the aircraft. If more than one fault is detected (block 214) then the pilot may elect to abort the takeoff or perform a fuel dump and air turnback as part of the aircraft control process (block 218).

By contrast, again referring to FIG. 7, a pilot without the advantages of the invention would, in a less precise and consistent manner than the invention facilitates, unconsciously attempt to manually mimic the foregoing operation. That is, as the pilot was performing a takeoff, the pilot would observe new process variables (block 200) using mostly visual, aural and tactile senses, compare these sensory inputs to his memory of similar takeoffs (block 232), perform all the functions of modeling, fault detection and identification (blocks 204, 206, 208, 210, 212, 214) in an unknown, unspecifiable human centric manner, try to remember what systems might need repair (block 216), and provide manual inputs to control the aircraft (block 218). That is, as the pilot was engaged in a takeoff, the pilot might be evaluating whether $v_1$ and $v_2$ were taking too much time and/or distance to achieve given the present weather conditions, passenger load, and fuel load, and, if so, what the cause or causes might be. The pilot might also be wondering whether the stick and rudder were responding as expected, or whether engine thrusts were balanced and as strong as expected, again taking into account present conditions. Human beings can often be quite good at making such evaluations, but they are inconsistent and imprecise depending upon their experience and mental state at the time of the evaluations. The invention accomplishes these evaluations precisely and consistently.

Feedwater Control Illustration

Consider the application of the invention to the control of feedwater flow to the steam generator of an experimental nuclear electric power generation system.

The major parts of such a system comprise a nuclear reactor primary heat source, primary and secondary heat transport systems, and a steam generator driving a steam turbine that turns an electricity generator. The primary coolant is rapidly forced into the bottom of the reactor at a low temperature, exits the top of the reactor at a high temperature, enters the top of the intermediate heat exchanger, cools down as it travels to the bottom, exits the bottom of the intermediate heat exchanger, and again enters the bottom of the reactor in a continuous cycle. The intermediate heat exchanger transfers the primary heat into a secondary loop of continuously flowing coolant wherein the secondary coolant enters the bottom of the intermediate heat exchanger at a low temperature, leaves top at a high temperature, enters the top of the steam generator at this high temperature, and leaves the bottom of the steam generator at a low temperature.

Like the intermediate heat exchanger, the steam generator is a counter-current heat exchanger. Secondary coolant enters the top of the steam generator, flows downward through the shell and exits at the bottom. Inside the shell are many hundreds of smaller, hollow tubes. Feedwater enters the bottom of the tube interiors, flows upward through the tubes, and exits at the top. The downward-flowing secondary coolant in the steam generator cools as it transfers heat to the upward-flowing feedwater. Eventually the upward-flowing feedwater becomes steam and exits the steam generator. The steam flows across steam turbine blades that turn an electricity generator.

The major process of an electricity-generating power plant is thus one of producing primary heat and turning it into steam. In doing so, the most difficult control problem is that of controlling feedwater flow. This is because the steam generator contains both water and steam. The lower part of the steam generator contains water while the upper part contains steam. Water transfers heat very rapidly while steam transfers heat at a much slower rate. On one hand, if the feedwater enters the steam generator too slowly then eventually the entire steam generator will contain steam and the secondary coolant will not be cooled enough as it leaves the bottom of the steam generator. In turn, the secondary coolant will not be able to cool the primary coolant in the intermediate heat exchanger. And in turn, the primary coolant will enter the bottom of the reactor core at too high a temperature and eventually cause damage to the reactor. Also, if the entire steam generator contains steam some damage to the tubes may be expected. On the other hand, if the feedwater enters the steam generator too rapidly then eventually the entire steam generator will contain water that will impinge on the steam turbine blades causing immediate damage.

Thus it is essential that exactly the right amount of feedwater be provided so that the correct amount of steam can be produced without damage to any of the components of the overall electricity generating system. As the plant changes power from startup to relatively stable high-power operation to shutdown, the feedwater flow must change dramatically. A modern anticipatory controller designed for such a plant uses 7 inputs to control the feedwater flow valve position: primary power, primary flow, secondary power, secondary flow, steam power, steam flow, and water level in the steam generator. A change in primary system power manifests itself some seconds later as a change in secondary system power, and even later as a change in steam system power which requires a change in feedwater flow. As the feedwater controller detects a change in primary power it can determine the expected times and amounts of power changes in the secondary and steam systems and provide the right amount of feedwater at the right time. This requires extremely accurate values of all 7 input variables, and because there is some probability that some of the 7 inputs may fail or at times not be available, it is also necessary that such an advanced controller be able to operate with 6 inputs as long as one of them is the water level in the steam generator.

The advanced controller just described can be implemented in accordance with the invention. Several plant startup/high-power/shutdown cycles are first analyzed to provide validation criteria and modeling and measuring errors (FIG. 7, block 232). A computer programmed to perform the operations of FIG. 7 then samples the 7 aforementioned process variables (block 200) about 4 times per second. The advanced controller (i.e. block 218) then automatically uses all modeled values and modeling uncertainties if no faults are detected (blocks 204, 206, 208), or uses the modeled value and modeling uncertainty for the faulted input plus the measured values and measuring uncertainties for the unfaulted inputs if only one fault is detected (blocks 210, 212). If more than one fault is detected (block 214) then only the water level in the steam generator would be used to control feedwater flow. Any faults detected can be used to direct system repair efforts (block 216).

Without the advantages of tile invention, prior art control of feedwater flow is achieved only via the water level in tile steam generator.

Loan Application Illustration

Consider the application of the invention to the approval of a loan for an individual or business.

Before a loan is made, many variables pertaining to the individual or entity applying for the loan are collected by the lender such as age, marital status, health status, residence location, income level, educational level, type of employment, area of employment, outstanding loan amounts and payment schedules, previous loans and performances, insurance policies, financial assets, real estate assets, loan amount, loan down payment, loan collateral, loan purpose, and so on. It is the nature of economics that, while tile differences between individual situations are enormous when examined in their totality, there are distinct patterns among borrowers. Young people just starting out may need to finance homes, cars and education for themselves. People reaching the middle of their careers also may need to finance homes, cars and education but the homes and cars may be more expensive and the education may be for their dependents. People near the end of their careers may want to finance luxuries such as vacation homes, mobile homes and special-purpose vehicles. Patterns in these categories are dependent on education, income level, and current obligations among other things. But whatever the variables considered by an experienced lender before making a loan, it may be assumed that, in the judgment of the lender, the best set of variables available are collected and have been collected for some time.

In this illustration, loans that have been both successful and unsuccessful as determined by the lender would be used for reference data and any new loans may be classified as potentially successful (class 1) or unsuccessful (class 2) in accordance with the invention. Analysis of the reference data provides the validation criteria and modeling and measuring uncertainties (FIG. 7, block 232). The reference data include values for all the variables collected by the lender on an application form plus the observed class number. New loan variables (block 200) include values for all the variables collected by the lender on an application form but are missing the class number. The missing class number can be initially assigned a value 0, the loan application modeled (block 204) and the number of faults determined (blocks 206, 210, 214). If any faults are detected then a repair process (block 216) can be invoked to determine the source of the faults. Possibly the faults may be due to some misunderstanding by the loan applicant in responding to one or more items on the loan application.

After resolution of the faults by the repair process (block 216) the loan application is again modeled (block 204), if necessary, and the modeled class number, having a value between 1 and 2, is recorded. The distribution of the modeled class number for reference applications with class number 1 can be determined by analyzing the reference data (block 232). Refer to this distribution as distribution 1. The distribution of the modeled class number for reference applications with class number 2 can be similarly determined. Refer to this distribution as distribution 2. The fraction of applications in distribution 1 that lie to the left of the modeled class number recorded as above equals the confidence level that the new applicant potentially belongs to class 1. Refer to this confidence level as confidence level 1. The fraction of applications in distribution 2 that lie to the right of the modeled class number recorded as above equals the confidence level that the new applicant potentially belongs to class 2. Refer to this confidence level as confidence level 2. Final control (block 218) of the loan process may involve forming the ratio of confidence level 1 to confidence level 2 and deciding to make the loan if this ratio is sufficiently high to satisfy the lender.

A lender without the advantages would, in a less precise and consistent manner than the invention facilitates, try to mimic the foregoing operation. Referring again to FIG. 7, the lender would accept an application (block 200), try to verify (block 216) many of the items on the new loan application, then apply a predetermined set of miles and judgments to the application, and make a decision (block 218). Experienced loan officers, especially those with a good memory of previous loan data, may be able to apply the rules and judgments with skill, possibly with computer assistance, and make a high percentage of "good" loans. Inexperienced loan officers may not be as successful. The invention removes most human experienced-based components from the loan making decision by treating and utilizing previous loan data consistently and precisely.

It is very important to note that all applications of the invention are essentially identical no matter whether the multivariate system or process is a physical one or an informational one. This is because any multivariate system or process can be characterized by a list of numbers. As the system or process changes, the numbers change but generally have patterns characteristic of the particular states that the system or process passes through as it changes. The invention recognizes, analyzes, and models such patterns to derive uncertainty information—the system or process that the patterns arise from is irrelevant.

Thus the invention is applicable to a variety of manufacturing, operational, and informational processes including, but not limited to, those involved with aircraft, aeronautics, biology, chemicals, electric power, food products, genetics, metals, oil refining, pharmaceuticals, plastics, pulp and paper, semiconductors, econometrics, finances, investments, loans, and psychometrics.

The following two examples, one actual and one simulated, are identical to one another except for the values of the numbers analyzed. Any application of the invention, except for the length of the lists and values of the numbers, can be exactly the same as these examples.

FIRST EXAMPLE

In this example, a reference set of measurements is modeled, then a non-reference set of unfaulted measurements is modeled, and finally the same non-reference set of measurements with one fault introduced is modeled.

The Minnesota Multiphasic Personality Inventory—2 ("MMPI—2"; see: *Minnesota Multiphasic Personality Inventory—2 Manual for Administration and Scoring*, University of Minnesota Press, Minneapolis, Minn., 1989) is used to create a human personality profile comprising 13 basic scales:

| 1 | L | Lie |
| 2 | F | Infrequency |
| 3 | K | Correction |
| 4 | Hs | Hypochondriasis |
| 5 | D | Depression |
| 6 | Hy | Conversion Hysteria |
| 7 | Pd | Psychopathic Deviate |
| 8 | Mf | Masculinity-Femininity |
| 9 | Pa | Paranoia |
| 10 | Pt | Psychasthenia |
| 11 | Sc | Schizophrenia |
| 12 | Ma | Hypomania |
| 13 | Si | Social Introversion |

For a large number of inventories from a community population the T-scores for each of these scales may be expected to have an average value of 50 points with a standard deviation of 7.5 points. This standard deviation is generally estimated to comprise a combination of approximately 5 points of random uncertainty and approximately 5 points of real personality variance. Interpretative bands for these scales are typically 10 points in width. This means that nearly half the individuals producing a score very near the upper end of the band plus nearly half the individuals producing a score very near the lower end of the band are not given correct interpretations. Only the individuals producing a T-score very near the middle of the band receive correct interpretations at a high confidence level.

Reducing the uncertainties in such T-scores is therefore extremely important and useful because the MMPI-2 is one of the oldest and is the most widely used personality inventory in the world. In particular, it is often applied to a prison population to provide a useful description of an inmate's general personality and psychological functioning. However, several issues arise when the MMPI-2 is administered to a prison population. Offenders are often motivated to hide their true personality and their level of psychological functioning. Doing so can be rewarded by such things as: receiving early release, transfer to "softer" mental health units, avoidance of being placed in an institution outside of their home state, and referral for psychiatric services that lead to medications. The MMPI-2 provides guidelines for detecting distorted profiles and in some cases how to correct the distortion. But detecting unusual response patterns is a perennial problem, and once a distorted profile is suspected the usual response is to discard it. Although the distributor of the MMPI-2 estimates 60–90 minutes for an individual to complete the inventory, individuals familiar with offender assessment are well aware that this is an optimistic estimate for inmates. The MMPI-2 is perceived by inmates as a laborious instrument and is often beyond the attention span of many offenders.

As a result of these issues there are much larger random uncertainties associated with T-scores for a prison population than for a community population and it is doubly important to find a way to reduce them. Moreover, the uncertainties may vary widely between different T-scores for a prison population. Application of the invention to the T-scores for a prison population reveals that the modeled values of T-scores have smaller uncertainties than do the measured T-scores. As a consequence, a model of an inmate's personality profile derived in accordance with the invention may have uncertainties reduced to the extent that the model profile may be valid, whereas the "real" profile may be invalid.

Profiles of T-scores for the 13 basic scales of the MMPI-2 were obtained from the State of Iowa Department of Corrections. A total of 388 profiles were obtained for which no subjective judgments concerning validity were applied and all legible inventories were used. The 388 Iowa profiles form the reference matrix for application of the invention.

For this example, the FIG. 1 modeling parameters were selected as m=13, n=388 and n'=9; the FIG. 3B parameter M was selected as M=8; and, three successive modeling procedures were performed in implementing the FIG. 4 series of operations.

The example yields the following final modeling results and parameters, in accordance with the FIGS. 5A–5B series of operations:

$s_1$=0.901
$s_2$=0.909
$s_3$=0.900
$s_4$=0.902
$s_5$=0.900
$s_6$=0.902
$s_7$=0.900
$s_8$=0.901
$s_9$=0.903

$s_{10}=0.902$
$s_{11}=0.901$
$s_{12}=0.902$
$s_{13}=0.904$
$_{exp}s=0.900$

It is clear that all the final $1-s_i$ agree with each other and with $1-_{exp}s$ within 10%, so it can be concluded that the modeling procedure has produced results with balanced contributions from each of the T-Scores, and that the differences between the measured and modeled T-scores are approximately normally distributed with mean values of zero. It was further determined that:

$_{min}c_1=0.9979$
$_{min}c_2=0.9979$
$_{min}c_3=0.9979$
$_{min}c_4=0.9980$
$_{min}c_5=0.9980$
$_{min}c_6=0.9980$
$_{min}c_7=0.9979$
$_{min}c_8=0.9979$
$_{min}c_9=0.9980$
$_{min}c_{10}=0.9980$
$_{min}c_{11}=0.9979$
$_{min}c_{12}=0.9980$
$_{min}c_{13}=0.9980$ It was then determined that:

$_{max}c^2_1=0.5786$
$_{max}c^2_2=0.5327$
$_{max}c^2_3=0.5831$
$_{max}c^2_4=0.6227$
$_{max}c^2_5=0.5575$
$_{max}c^2_6=0.6558$
$_{max}c^2_7=0.6644$
$_{max}c^2_8=0.5538$
$_{max}c^2_9=0.4892$
$_{max}c^2_{10}=0.5385$
$_{max}c^2_{11}=0.5890$
$_{max}c^2_{12}=0.6746$
$_{max}c^2_{13}=0.4754$ All these sums of squares of coefficients are less than unity, so it was further determined that the modeling uncertainties are smaller than the measuring uncertainties for all T-scores. It was then determined that the measuring and modeling uncertainty limits in the T-scores are as follows:

| | | |
|---|---|---|
| $t_1 = 9.88$ | $u_1 = 6.99$ | $v_1 = 3.33$ |
| $t_2 = 10.12$ | $u_2 = 7.16$ | $v_2 = 3.43$ |
| $t_3 = 5.99$ | $u_3 = 4.24$ | $v_3 = 2.05$ |
| $t_4 = 8.04$ | $u_4 = 5.69$ | $v_4 = 2.71$ |
| $t_5 = 7.25$ | $u_5 = 5.13$ | $v_5 = 2.48$ |
| $t_6 = 8.24$ | $u_6 = 5.83$ | $v_6 = 2.79$ |
| $t_7 = 9.34$ | $u_7 = 6.60$ | $v_7 = 3.17$ |
| $t_8 = 10.81$ | $u_8 = 7.64$ | $v_8 = 3.70$ |
| $t_9 = 11.34$ | $u_9 = 8.02$ | $v_9 = 3.83$ |
| $t_{10} = 4.92$ | $u_{10} = 3.48$ | $v_{10} = 1.67$ |
| $t_{11} = 5.47$ | $u_{11} = 3.87$ | $v_{11} = 1.85$ |
| $t_{12} = 9.52$ | $u_{12} = 6.73$ | $v_{12} = 3.23$ |
| $t_{13} = 7.24$ | $u_{13} = 5.12$ | $v_{13} = 2.47$ |

A new personality profile was then obtained from an inmate in the State of Idaho Department of Corrections. The T-scores of the Idaho profile are as follows:

$x_1=35$
$x_2=95$
$x_3=56$
$x_4=69$
$x_5=47$
$x_6=71$
$x_7=84$
$x_8=46$
$x_9=68$
$x_{10}=56$
$x_{11}=61$
$x_{12}=64$
$x_{13}=37$

According to standard interpretive rules for the MMPI-2, this measured profile would be judged invalid, mainly because of the very high value of $x_2$.

Application of the invention to the Idaho profile as described above with reference to FIGS. 6A–6C, revealed that n' nearest neighbors could be found. It was also found that $c_1=1.000$
$c_2=1.002$
$c_3=1.000$
$c_4=1.000$
$c_5=1.000$
$c_6=1.000$
$c_7=1.000$
$c_8=1.000$
$c_9=0.9992$
$c_{10}=1.000$
$c_{11}=1.000$
$c_{12}=1.000$
$c_{13}=1.000$ Because all the $c_i$ are greater than the $_{min}c_i$, it was concluded that all the Idaho T-scores characterize the human personality process in the same manner as do the Iowa T-scores. Therefore, it was concluded that the following measured values, modeled values, and uncertainty limits of T-scores accurately describe the Idaho profile:

| | | | | |
|---|---|---|---|---|
| $x_1 = 35$ | $y_1 = 53.6$ | $t_1 = 9.88$ | $u_1 = 6.99$ | $v_1 = 3.33$ |
| $x_2 = 95$ | $y_2 = 66.5$ | $t_2 = 10.12$ | $u_2 = 7.16$ | $v_2 = 3.43$ |
| $x_3 = 56$ | $y_3 = 47.6$ | $t_3 = 5.99$ | $u_3 = 4.24$ | $v_3 = 2.05$ |
| $x_4 = 69$ | $y_4 = 59.2$ | $t_4 = 8.04$ | $u_4 = 5.69$ | $v_4 = 2.71$ |
| $x_5 = 47$ | $y_5 = 60.6$ | $t_5 = 7.25$ | $u_5 = 5.13$ | $v_5 = 2.48$ |
| $x_6 = 71$ | $y_6 = 61.3$ | $t_6 = 8.24$ | $u_6 = 5.83$ | $v_6 = 2.79$ |
| $x_7 = 84$ | $y_7 = 77.2$ | $t_7 = 9.34$ | $u_7 = 6.60$ | $v_7 = 3.17$ |
| $x_8 = 46$ | $y_8 = 55.0$ | $t_8 = 10.81$ | $u_8 = 7.64$ | $v_8 = 3.70$ |
| $x_9 = 68$ | $y_9 = 72.0$ | $t_9 = 11.34$ | $u_9 = 8.02$ | $v_9 = 3.83$ |
| $x_{10} = 56$ | $y_{10} = 53.5$ | $t_{10} = 4.92$ | $u_{10} = 3.48$ | $v_{10} = 1.67$ |
| $x_{11} = 61$ | $y_{11} = 61.3$ | $t_{11} = 5.47$ | $u_{11} = 3.87$ | $v_{11} = 1.85$ |
| $x_{12} = 64$ | $y_{12} = 72.7$ | $t_{12} = 9.52$ | $u_{12} = 6.73$ | $v_{12} = 3.23$ |
| $x_{13} = 37$ | $y_{13} = 42.4$ | $t_{13} = 7.24$ | $u_{13} = 5.12$ | $v_{13} = 2.47$ |

The modeled profile has smaller uncertainties than the measured profile and, according to standard interpretive rules for the MMPI-2, would be judged valid.

A fault was then introduced into the first T-score of the Idaho profile as follows:

$x_1=120$

Application of the invention to the faulted Idaho profile as described above in relation to FIGS. 6A–6C revealed that n' nearest neighbors could be found. It was also found that $c_1=1.000$
$c_2=0.9965$
$c_3=0.9952$
$c_4=0.9955$
$c_5=0.9962$
$c_6=0.9957$ $c_7=0.9957$
$c_8=0.9953$
$c_9=0.9953$
$c_{10}=0.9963$
$c_{11}=0.9957$
$c_{12}=0.9946$
$c_{13}=0.9949$ Because only $c_1$ is greater than $_{min}c_1$ it was concluded that only one fault exists, that the modeled value $y_1$ and modeling uncertainty limits $u_1$ and $v_1$ could be associated with $x_1$ and that the measuring uncertainty limits $t_i$ and $u_i$ could be associated with the $x_i$ for i=2 to 13:

| | | | | |
|---|---|---|---|---|
| $x_1 = 35$ | $y_1 = 53.6$ | $t_1 = —$ | $u_1 = 6.99$ | $v_1 = 3.33$ |
| $x_2 = 95$ | $y_2 = —$ | $t_2 = 10.12$ | $u_2 = 7.16$ | $v_2 = —$ |
| $x_3 = 56$ | $y_3 = —$ | $t_3 = 5.99$ | $u_3 = 4.24$ | $v_3 = —$ |
| $x_4 = 69$ | $y_4 = —$ | $t_4 = 8.04$ | $u_4 = 5.69$ | $v_4 = —$ |
| $x_5 = 47$ | $y_5 = —$ | $t_5 = 7.25$ | $u_5 = 5.13$ | $v_5 = —$ |
| $x_6 = 71$ | $y_6 = —$ | $t_6 = 8.24$ | $u_6 = 5.83$ | $v_6 = —$ |
| $x_7 = 84$ | $y_7 = —$ | $t_7 = 9.34$ | $u_7 = 6.60$ | $v_7 = —$ |
| $x_8 = 46$ | $y_8 = —$ | $t_8 = 10.81$ | $u_8 = 7.64$ | $v_8 = —$ |
| $x_9 = 68$ | $y_9 = —$ | $t_9 = 11.34$ | $u_9 = 8.02$ | $v_9 = —$ |
| $x_{10} = 56$ | $y_{10} = —$ | $t_{10} = 4.92$ | $u_{10} = 3.48$ | $v_{10} = —$ |
| $x_{11} = 61$ | $y_{11} = —$ | $t_{11} = 5.47$ | $u_{11} = 3.87$ | $v_{11} = —$ |
| $x_{12} = 64$ | $y_{12} = —$ | $t_{12} = 9.52$ | $u_{12} = 6.73$ | $v_{12} = —$ |
| $x_{13} = 37$ | $y_{13} = —$ | $t_{13} = 7.24$ | $u_{13} = 5.12$ | $v_{13} = —$ |

Two faults were then introduced into the first and last T-scores of the Idaho profile as follows:

$x_1=120$ $x_{13}=120$

Application of the invention to the faulted Idaho profile as described above in relation to FIGS. 6A–6C revealed that n' nearest neighbors could be found. It was also found that $c_1=0.9873$
$c_2=0.9845$
$c_3=0.9820$
$c_4=0.9837$
$c_5=0.9843$
$c_6=0.9839$
$c_7=0.9831$
$c_8=0.9841$
$c_9=0.9819$
$c_{10}=0.9820$
$c_{11}=0.9818$
$c_{12}=0.9817$
$c_{13}=0.9949$ Because none of the $c_i$ are greater than the $_{min}c_i$ it was concluded that multiple faults exist, that none of the measuring uncertainties $u_i$, none of the modeled values $y_i$, and any of the modeling uncertainty limits $t_i$, $u_i$; nor $v_i$ could be associated with the $x_i$.

The foregoing example illustrates the general capabilities of the invention, including the identification of measurements for which modeling uncertainties are less than measuring uncertainties, the estimation of measuring and modeling uncertainty limits, the information that new measurements offer either valid or invalid descriptions of the process, and associating measuring uncertainty limits, modeled values, and modeling uncertainty limits with new measurements depending upon the number of faults in the new measurements.

SECOND EXAMPLE

The preceding example involves real data for which it is impossible to illustrate that uncertainties have actually been reduced. In order to illustrate that uncertainties may actually be reduced, it is necessary to resort to simulated variables. Accordingly, an example is now provided of simulations of 400 profiles with 13 values in each profile. Each simulated value without measuring uncertainties lay between 46 and 104. Further, these 400 simulated profiles without measuring uncertainties are linear with a variety of positive, negative, and zero slopes. The variables of these simulated profiles are designated by $z_{ij}$ for i=1 to 13 and j=1 to 400. Then to each $z_{ij}$ was added a randomly chosen member of a normal distribution of values with a standard deviation of 7 to create the $x_{ij}$ of the reference matrix X. Thus the 400 simulated profiles cover approximately the same numerical space as do the MMPI-2 profiles discussed above.

For this example, the FIG. 1 modeling parameters were selected as m=13, n=400, and n'=9; the FIG. 3B parameter M was selected as M=8; and, three successive modeling procedures were performed in implementing the FIG. 4 series of operations.

This example yields the following final modeling results and parameters in accordance with the FIG. 5A–5B series of operations:

$s_1=0.902$
$s_2=0.902$
$s_3=0.899$
$s_4=0.901$
$s_5=0.900$
$s_6=0.901$
$s_7=0.900$
$s_8=0.899$
$s_9=0.901$
$s_{10}=0.903$
$s_{11}=0.899$
$s_{12}=0.901$
$s_{13}=0.899$
$_{exp}s=0.900$ It is clear that all the final 1–$s_i$ agree with each other and with 1–$_{exp}s$ within 10% and so it is concluded that the modeling procedure has produced results with balanced contributions from each of the simulated variables, and that the differences between the measured and modeled values are approximately normally distributed with mean values of zero. It was then determined that:

$_{max}c^2_1=0.4484$
$_{max}c^2_2=0.4697$
$_{max}c^2_3=0.6679$
$_{max}c^2_4=0.4332$
$_{max}c^2_5=0.5684$
$_{max}c^2_6=0.4604$
$_{max}c^2_7=0.5557$
$_{max}c^2_8=0.4714$
$_{max}c^2_9=0.4560$
$_{max}c^2_{10}=0.4748$
$_{max}c^2_{11}=0.4643$
$_{max}c^2_{12}=0.4262$
$_{max}c^2_{13}=0.4778$ All these sums of squares of coefficients are less than unity so it was further determined that the modeling uncertainties are smaller than the measuring uncertainties for all simulated values. The elements $y_{ij}$ of the model reference matrix Y are also derived as previously explained with reference to FIGS. 5A–5B. What is important here is that the actual measuring uncertainties are derived directly from the differences between the $x_{ij}$ and the $z_{ij}$, and the actual modeling uncertainties from the differences between the $y_{ij}$ and the $z_{ij}$. When all these derivations are performed it is found that the measuring and modeling uncertainties are bounded by the measuring and modeling uncertainty limits as follows:

|  | Measuring Uncertainty |  | Modeling Uncertainty |  |
|---|---|---|---|---|
| $t_1 = 9.19$ | 7.08 | $u_1 = 6.50$ | 6.07 | $v_1 = 3.03$ |
| $t_2 = 8.88$ | 7.08 | $u_2 = 6.23$ | 5.62 | $v_2 = 2.88$ |
| $t_3 = 8.43$ | 6.88 | $u_3 = 5.96$ | 5.35 | $v_3 = 2.76$ |
| $t_4 = 8.51$ | 6.91 | $u_4 = 6.02$ | 4.62 | $v_4 = 2.80$ |
| $t_5 = 8.23$ | 7.27 | $u_5 = 5.82$ | 4.19 | $v_5 = 2.75$ |
| $t_6 = 7.83$ | 7.12 | $u_6 = 5.54$ | 4.13 | $v_6 = 2.57$ |
| $t_7 = 8.45$ | 7.13 | $u_7 = 5.98$ | 3.88 | $v_7 = 2.81$ |
| $t_8 = 7.90$ | 6.81 | $u_8 = 5.59$ | 4.18 | $v_8 = 2.62$ |
| $t_9 = 8.59$ | 7.10 | $u_9 = 6.07$ | 4.34 | $v_9 = 2.79$ |
| $t_{10} = 8.27$ | 6.72 | $u_{10} = 5.85$ | 4.42 | $v_{10} = 2.73$ |
| $t_{11} = 8.25$ | 6.97 | $u_{11} = 5.83$ | 4.88 | $v_{11} = 2.69$ |
| $t_{12} = 9.01$ | 7.35 | $u_{12} = 6.37$ | 5.73 | $v_{12} = 2.96$ |
| $t_{13} = 8.90$ | 7.10 | $u_{13} = 6.29$ | 5.56 | $v_{13} = 2.92$ |

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A method of controlling an m variable multivariate system or process, characterized by:
   (a) obtaining (220) historical reference data comprising numerical measurements of said m variables, said measurements collectively encompassing a plurality of variations within one or more operational states of said system or process;
   (b) modeling (222) said historical reference data to produce modeled values, modeling uncertainties and measuring uncertainties of said reference data set measurements;
   (c) deriving (224–230) a final model of said historical reference data by sequentially repeating said modeling until successively derived sums of all of said measurement uncertainties are approximately equal and successively derived sums of all of said modeling uncertainties are approximately equal;
   (d) deriving (232) a set of modeling parameters characteristic of said final model; and,
   (e) combining said measuring uncertainties with a new data set (200) comprising numerical measurements of said m variables, said new data set measurements collectively encompassing said plurality of variations within said one or more operational states of said system or process to control (218) continued operation of said multivariate system or process.

2. A method as defined in claim 1, further characterized by:
   (a) determining (232) whether said modeling uncertainties exceed said measurement uncertainties;
   (b) for said modeling uncertainties that do not exceed said measurement uncertainties:
      (i) determining (206) whether there are no faults in said new data set measurements; and,
      (ii) if there are no faults in maid new data set measurements, applying (208) all of said modeled values of said reference data set measurements and all of said modeled values of said new data set measurements to control (218) said multivariate system or process.

3. A method as defined in claim 1, further characterized by:
   (a) determining (232) whether maid modeling uncertainties exceed said measurement uncertainties;
   (b) for said modeling uncertainties tat do not exceed said measurement uncertainties;
      (i) determining (206) whether there are no faults in said new data set measurements; and,
      (ii) if there are no faults in said new data set measurements, applying (208) all of said modeling uncertainties of said reference data set measurements to control (218) said multivariate system or process.

4. A method as defined in claim 1, further characterized by:
   (a) determining (232) whether said modeling uncertainties exceed said measurement uncertainties;
   (b) for said modeling uncertainties that do not exceed said measurement uncertainties:
      (i) determining (210) whether there is a fault in only one said new data set measurements ; and,
      (ii) if there is a fault in only one of said new data set measurements, applying (212) said modeled value of said faulted one of said new data set measurements to control (218) said multivariate system or process.

5. A method as defined in claim 1, further characterized by:
   (a) determining (232) whether said modeling uncertainties exceed said measurement uncertainties;
   (b) for said modeling uncertainties that do not exceed said measurement uncertainties:
      (i) determining (210) whether there is a fault in only one of said new data set measurements; and,
      (ii) if there is a fault in only one of said new data set measurements, applying (212) said modeling uncertainty of said faulted one of said new data set measurements to control (218) said multivariate system or process.

6. A method as defined sidelined in claim 1, further characterized by:
   (a) determining (232) whether said modeling uncertainties exceed said measurement uncertainties;
   (b) for said modeling uncertainties that do not exceed said measurement uncertainties:
      (i) determining (210, 214) whether there is a fault in more than one of said new data set measurements; and,
      (ii) if there is a fault in more than one of side new data set measurements, determining the identity of each faulted one of said more than one of said new data set measurements; and,
      (iii) applying (214) said identity of said each faulted one of said more than one of said new data set measurements said modeling uncertainties of all of said new data set measurements to repair (216) said multivariate system or process.

7. A method as defined in claim 1, further characterized by:
   (a) determining (232) whether said modeling uncertainties exceed said measurement uncertainties;
   (b) for said modeling uncertainties that do not exceed said measurement uncertainties:
      (i) determining (210) whether there is a fault in only one of said new data set measurements;
      (ii) if there is a fault in only one of said new data set measurements:

(1) determining the identity of said faulted one of said new data set measurements; and,
(2) applying (212) said identity of said faulted one of said new data set measurements to control (218) said multivariate system or process.

8. A method as defined in claim 1, further characterized by:
(a) determining (232) whether said modeling uncertainties exceed said measurement uncertainties;
(b) for said modeling uncertainties that do not exceed said measurement uncertainties:
(i) determining (210) whether there is a fault in only one of said new data set measurements;
(ii) if there is a fault in only one of said new data set measurements:
(1) determining the identity of said faulted one of said new data set measurements; and,
(2) applying (212) said identity of said faulted one of said new data set measurements to repair (216) said multivariate system or process.

9. A method as defined in claim 1, wherein said multivariate system or process is any physical process.

10. A method as defined in claim 1, wherein said multivariate system or process is any informational process.

11. A method as defined in claim 1, wherein said multivariate system or process is any manufacturing, operational, or informational process.

12. A method as defined in claim 1, wherein said multivariate system or process is any one of an aircraft, aeronautics, biology, chemical, electric power, food product, genetic, metals, oil refining, pharmaceutical, plastic, pulp and paper, semiconductor, econometric, financial, investment, loan, or psychometric process.

13. A method as defined in claim 1, further characterized by before said modeling of said historical reference data to produce said modeled values of said reference data set measurements, comparing (32) said reference data set measurement to a corresponding set of predefined criteria to determine whether said reference data set measurements adequately characterize variations within said reference data set measurements.

14. A method as defined in claim 1, further characterized by, during said deriving of said final model, comparing (32) said sums of all of said measurement and modeling uncertainties to a corresponding set of predefined criteria to determine whether said reference data set measurements adequately characterize variations within said reference data set measurements.

15. A method as defined in claim 1, further characterized by, during said deriving of said final model, comparing (94, 96,98) said sums of all of said measurement and modeling uncertainties to a corresponding set of predefined criteria to determine whether said sums of all of said measurement and modeling uncertainties are normally distributed.

16. A method as defined in claim 1, further characterized by, during said applying of said modeling parameters to said new data set, comparing (146, 148, 152) said new data set measurements to a corresponding set of predefined criteria to determine whether said new data set measurements adequately characterize variations within said new data set measurements.

17. A method as defined in claim 16, further characterized by, after determining that said new data set measurements adequately characterize said variations within said new data set measurements, associating all of said measurement uncertainties with all of said new data set measurements.

18. A method as defined in claim 17, further characterized by comparing (174, 180) said new data set measurements to said corresponding set of predefined criteria to determine whether said new data set measurements contain any faults.

19. A method as defined in claim 17, further characterized by comparing (174, 180) said new data set measurements to said corresponding set of predefined criteria to determine (192) whether said new data set measurements contains one and only one fault and to identify that one of said new data set measurements which is faulted.

20. A method as defined in claim 17, further characterized by comparing (174) said new data set measurements to said corresponding set of predefined criteria to determine (176) whether said new data set measurements contains more than one fault and to identify each one of said new data set measurements which is faulted.

21. A method as defined in claim 18, further characterized by, if said new data set measurements contain no faults, replacing said new data set measurements with said modeled values of said new data set measurements.

22. A method as defined in claim 18, further characterized by, if said new data set measurements contain no faults, replacing said measurement uncertainties with said modeling uncertainties.

23. A method defined in claim 19, further characterized by, if said new data set measurements contain one and only one fault replacing said faulted one of said new data set measurements with said modeled one of said new data set measurements corresponding to said faulted one of said new data set measurements.

24. A method defined in claim 19, further characterized by, if said new data set measurements contain one and only one fault replacing said measurement uncertainty of said faulted one of said new data set measurements with said modeling uncertainty of said faulted one of said new data set measurements.

25. A method of modeling m variable multivariate system or process, said method characterized by:
(a) forming (10) an m row by n column matrix X having:
(i) n column vectors $X_j$ respectively comprising numerical measurements of said m variables, said measurements collectively encompassing a plurality of variations within one or more operational states of said system or process, each one of said column vectors having elements $x_{ij}$ where i=1 to m and j=1 to n;
(ii) m row vectors $_iX$, each said row vector $_iX$ comprising elements $x_{ij}$ having a range $_{ran}x_i$ and an average $_{ave}x_i$; and,
(b) deriving (12) a similarity $x_{ij} \# x_{ik} = \max(0, 1, -|x_{ij}-x_{ik}|/w_i)$ between a $j^{th}$ example of an $i^{th}$ one of said measurements and a $k^{th}$ example of said $i^{th}$ one of said measurements, where $w_i$ is a weighting factor having an initial value equal to $_{ran}x_i$.

26. A method as defined in claim 25, further characterized by:
(a) selecting (20) an element $x_{ab}$ common to both a row vector $_aX$ and a column vector $X_b$ of said matrix X;
(b) removing (22) said element $x_{ab}$ from said column vector $X_b$ to produce an m−1 element column vector $X'_b$;
(c) removing (24) said row vector $_aX$ from said matrix X to produce an m−1 row by n column matrix X';

(d) deriving (26), for all j=1 to n, similarities $X'^T_j \# X'_b$ between said column vector $X'_b$ and a column vector $X'_j$ in said matrix X', wherein:

$$X'^T_j \# X'_b = (x_{1j} \# x_{1b} + x_{2j} \# x_{2b} + \ldots + x_{a-1,j} \# x_{a-1,b} + x_{a+1,j} \# x_{a+1,b} + \ldots + x_{mj} \# x_{mb})/(m-1)$$

(e) selecting (28) the largest n' of said n similarities, wherein 2<n'<m and wherein each one of said n' selected similarities is not equal to unity and not equal to zero; and, (f) determining (30, 32) that said matrix X inadequately characterizes said system or process in at least one of said operational states if said n' similarities do not exist.

27. A method as defined in claim 26, further characterized by:

(a) transforming (38, 40) said matrix X' into an m−1 row by n' column matrix X" by removing from said matrix X' all of said column vectors $X'_j$ lacking said n' similarities;

(b) deriving (42), for all j=1 to n' and all k=1 to n', similarities $X''^T_j \# X''_k$ between said column vector $X'_j$ and said column vector $X''_k$ in said matrix X" wherein:

$$X''^T_j \# X''_k = (x_{1j} \# x_{1k} + x_{2j} \# x_{2k} + \ldots + x_{a-1,j} \# x_{a-1,k} + x_{a+1,j} \# x_{a+1,k} + \ldots + x_{mj} \# x_{mk})/(m-1)$$

(c) deriving (44), for all j=1 to n', similarities $X''^T_j \# X'_b$ between said column vector $X''_j$ in said matrix X" and said column vector $X'_b$, wherein:

$$X''^T_j \# X'_b = (x_{1j} \# x_{1b} + x_{2j} \# x_{2b} + \ldots + x_{a-1,j} \# x_{a-1,b} + x_{a+1,j} \# x_{a+1,b} + \ldots + x_{mj} \# x_{mb})/(m-1)$$

(d) deriving (46) an n' element column vector $C = (X''^T \# X'')^{-1}(X''^T \# X'_b)$, wherein:
(i) $X''^T \# X''$ is a square matrix of $n'^2$ similarities $X''^T_j \# X''_k$;
(ii) $X''^T \# X'_b$ is a column vector of n' similarities $X''^T_j \# X'_b$;
(iii) said n' elements of said column vector C have a sum $c_{ab}$;
(iv) n' squares of elements of said column vector C have a sum $c^2_{ab}$;

(e) defining (48) a model $y_{ab}$ of said element $x_{ab}$, wherein:

$$y_{ab} = {}_aXC + (1 - c_{ab})_{ave}x_a;$$

(f) producing (50) pluralities $y_{ij}$, $c_{ij}$, and $c^2_{ij}$ for said models $y_{ab}$, said sum $c_{ab}$, and said sum $c^2_{ab}$ for all i=1 to m and for all j=1 to n;

(g) assembling (52) said plurality $y_{ij}$ of models into an m row by n column model matrix Y comprising:
(i) n column vectors $Y_j$ each one of said column vectors $Y_j$ having elements $y_{ij}$;
(ii) m row vectors $_iY$, each said row vector $_iY$ comprising elements $y_{ij}$ having an average $_{ave}y_i$;

(h) deriving (54) similarities $x_{ij} \# y_{ij}$ between corresponding elements in said matrix X and said matrix Y, wherein:

$$x_{ij} \# y_{ij} = \max(0, 1 - |x_{ij} - y_{ij}|/w_i);$$

(i) deriving (56) average similarities $s_i$ between elements in corresponding rows of said matrix X and said matrix Y for each one of said rows, wherein:

$$s_i = ((x_{i1} \# y_{i1}) + (x_{i2} \# y_{i2}) + \ldots + (x_{in} \# y_{in}))/n;$$

(j) deriving (64) root-mean-square deviations $t_i$ between elements in corresponding rows of said matrix X and said matrix Y for each one of said rows, wherein:

$$t_i = (((x_{i1} - y_{i1})^2 + (x_{i2} - y_{i2})^2 + \ldots + (x_{in} - y_{in})^2)/n)^{1/2};$$

(k) defining (66) a quantity M; for each row of said matrix X wherein:

$$M_i = {}_{ran}x_i/t_i;$$

(l) selecting (70) an integer M which approximates the largest one of said $M_i$; and, (m) redefining (72) said weighting factor $w_i$ as $w_i = Mt_i$.

28. A method as defined in claim 27, further characterized by:

(a) sequentially repeating (78, 80, 84) said method with said redefined weighting factor and without reselecting said integer M, until successive values of $1 - s_i$ differ by less than 10%; and, (b) determining (86) that said matrix X contains inaccurate measurements if said successive values of $1 - s_i$ do not differ by less than 10% after a selected number of sequential repetitions of said method.

29. A method as defined in claim 28, further characterized by:

(a) concluding (92, 94, 98) that differences between said $x_{ij}$ and said $y_{ij}$ are approximately normally distributed with a mean of zero if said $1 - s_i$ values lie within 10% of $1 - {}_{exp}s$, wherein:

$${}_{exp}s = 1 - (2/C)^{1/2}/M;$$

(b) determining (100) a limit $_{min}c_i$, below which 1% of said column vector sums $c_{ij}$ lie;
(c) deriving (102) averages $_{ave}c^2_i$ of $c^2_{ij}$;
(d) locating (104) maxima $_{max}c^2_i$ of $c^2_{ij}$;
(e) initially assigning (106) measuring uncertainty upper limit values equal to $t_i$;
(f) initially assigning (108) modeling uncertainty upper limit values equal to $t_i$;
(g) determining (114, 120) that modeling uncertainty limit values are less than measuring uncertainty limit values if $_{max}c^2_i < 1$;
(h) assigning (122) measuring uncertainty lower limits and reassigning (124) said modeling uncertainty upper limits as $u_i$ if $_{max}c^2_i < 1$, wherein $u_i = t_i(1/2)^{1/2}$; and,
(i) assigning (126) said modeling uncertainty lower limits as $v_i$ if $_{max}c^2_i < 1$, wherein $v_i = t_i(_{ave}c^2_i/2)^{1/2}$.

30. A method as defined in claim 29, further characterized by:

(a) acquiring (132) a column vector X having m numerical elements $x_i$;
(b) selecting (134) an element $x_n$ common to said row vector $_aX$ and to said vector X;
(c) removing (136) said selected element $x_a$ from said column vector X to produce an m−1 element column vector X';
(d) removing (142) said row vector $_aX$ from said matrix X to produce an m−1 row by n column matrix X';
(e) defining similarities $x_{ij} \# x_i$ between the said $x_{ij}$ and said elements $x_i$ wherein:

$$x_{ij} \# x_i = \max(0, 1 - |x_{ij} - x_i|/w_i);$$

(f) deriving (138, 140), for all j=1 to n, similarities $X'^T_j \# X'$ between a column vector $X'_j$ in said matrix X' and said column vector X', wherein:

$$X'^T_j \# X' = (x_{1j} \# x_1 + x_{2j} \# x_2 + \ldots + x_{a-1,j} \# x_{a-1} + x_{a+1,j} \# x_{a+1} + \ldots + x_{mj} \# x_m)/(m-1)$$

(g) selecting (144) the largest said n' of said n similarities wherein each one of said n' selected similarities is not equal to unity and not equal to zero;

(h) determining (146, 148) that said vector X is an invalid description of the process characterized by said matrix X if n' of said similarities $X'^T_j \#X'$ not equal to zero and not equal to unity cannot be formed;

(i) transforming (154, 156) said matrix X' into an m−1 row by n' column matrix X" by removing from said matrix X' all column vectors in said matrix X' lacking said n' selected similarities;

(j) deriving (158), for all j=1 to n' and all k=1 to n', similarities $X"^T_j \#X"_k$ between said column vector $X"_j$ and said column vector $X"_k$ in said matrix X" wherein:

$$X"^T_j \#X"_k = (x_{1j}\#x_{1k}+x_{2j}\#x_{2k}+\ldots+x_{a-1j}\#x_{a-1k}+x_{a+1j}\#x_{a+1k}+\ldots+x_{mj}\#x_{mk})/(m-1)$$

(k) deriving (164), for all j=1 to n', similarities $X"^T_j \#X'$ between said column vector $X"_j$ in said matrix X" and column vector X' wherein:

$$X"^T_j \#X' = (x_{1j}\#x_1+x_{2j}\#x_2+\ldots+x_{a-1j}\#x_{a-1}+x_{a+1j}\#x_{a+1}+\ldots+x_{mj}\#x_m)/(m-1);$$

(l) deriving (166) a column vector C with n' elements, wherein:
C=$(X"^T \#X")^{-1}(X"^T \#X')$ wherein:
  (i) $X"^T \#X"$ is the square matrix of $n'^2$ similarities $X"^T_j \#X"_k$;
  (ii) $X"^T \#X'$ is the column vector of n' similarities $X"^T_j \#X'$;
  (iii) n' elements of said column vector C have a sum $c_a$;

(m) producing (168) a model $y_a$ of element $x_a$ wherein:

$$y_a = {}_aXC + (1-c_a)_{ave} x_a;$$

(n) producing (170) pluralities $y_i$ and $c_i$ for said model $y_a$ and said sum $c_a$ for all i=1 to m;

(o) collecting (172) said models $y_i$ into a column vector Y;

(p) determining (174, 180, 182) that said vector X contains no faults if more than one of said sums $c_i$ are greater than ${}_{min}c_i$;

(q) associating all said $y_i$, all said $t_i$, all said $u_i$, and all said $v_i$ with all said $x_i$ if said vector X contains no faults;

(r) determining (174, 180, 192) that said vector X contains only one fault if only one of said sums $c_i$ is greater than ${}_{min}c_i$;

(s) associating (186) said $y_i$, said $u_i$ and said $v_i$ with said $x_i$ for which said sum $c_i$ is greater than ${}_{min}c_i$ if said vector X contains only one fault;

(t) associating (196) said $t_i$ and said $u_i$ with said $x_i$ for which said sums $c_i$ are not greater than ${}_{min}c_i$ if said vector X contains only one fault; and, (u) determining (174, 176) that said vector X contains more than one fault if none of said sums $c_i$ are $>{}_{min}c_i$.

* * * * *